Figure 6:
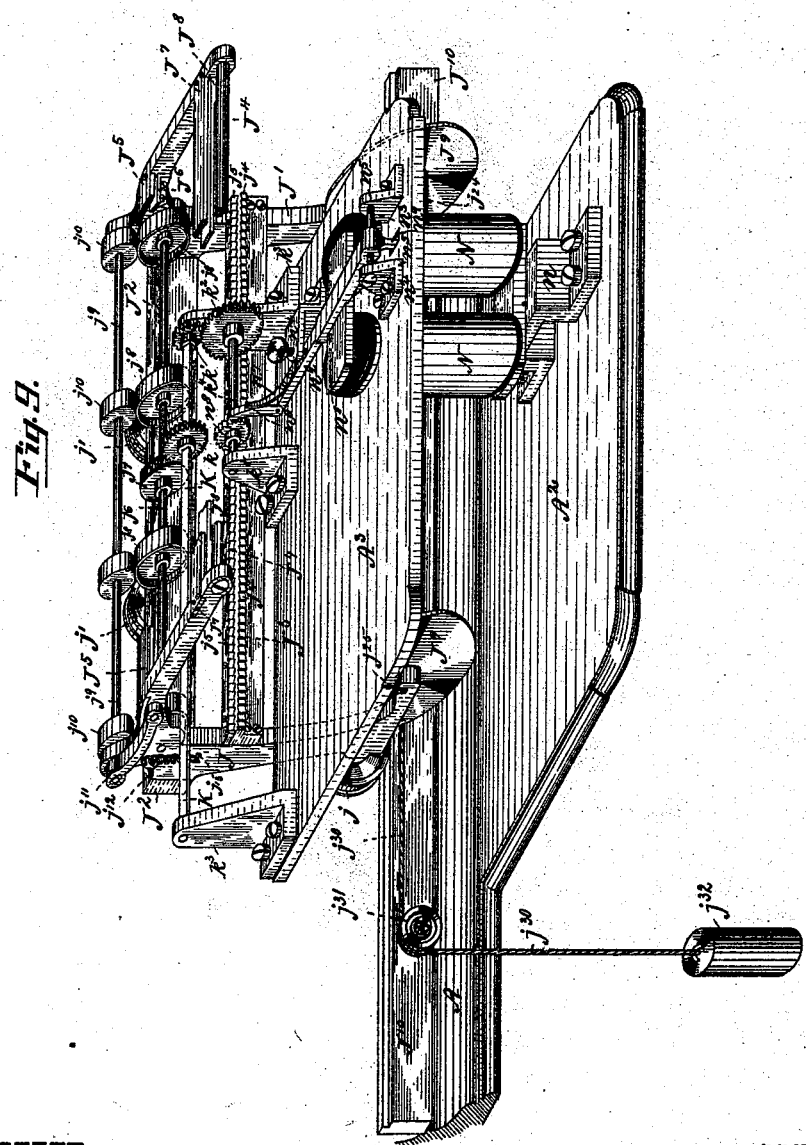

(No Model.) 12 Sheets—Sheet 1.
J. H. LINVILLE.
PRINTING TELEGRAPH.
No. 377,763. Patented Feb. 14, 1888.
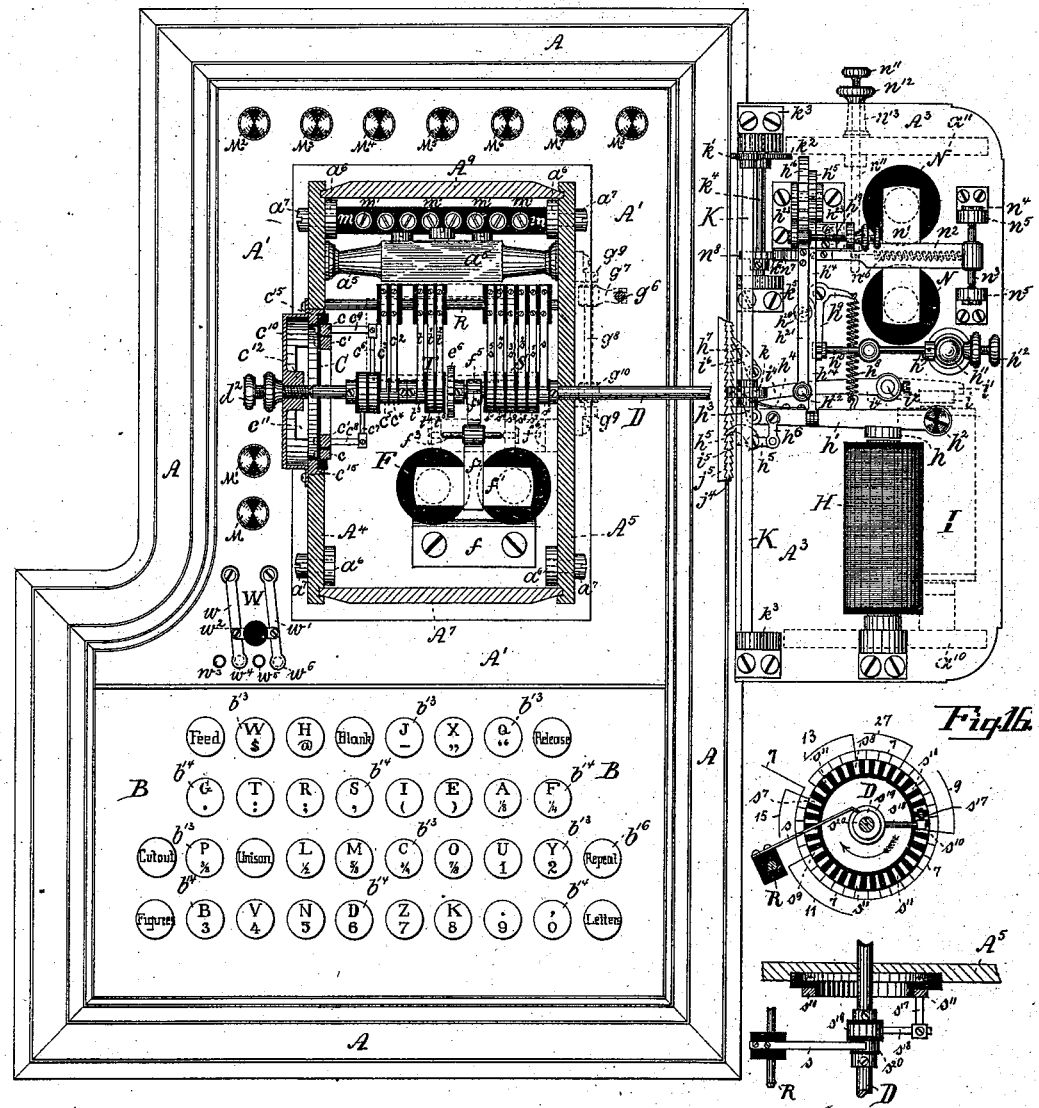
WITNESSES:
INVENTOR.

(No Model.)  12 Sheets—Sheet 2.
J. H. LINVILLE.
PRINTING TELEGRAPH.
No. 377,763.  Patented Feb. 14, 1888.
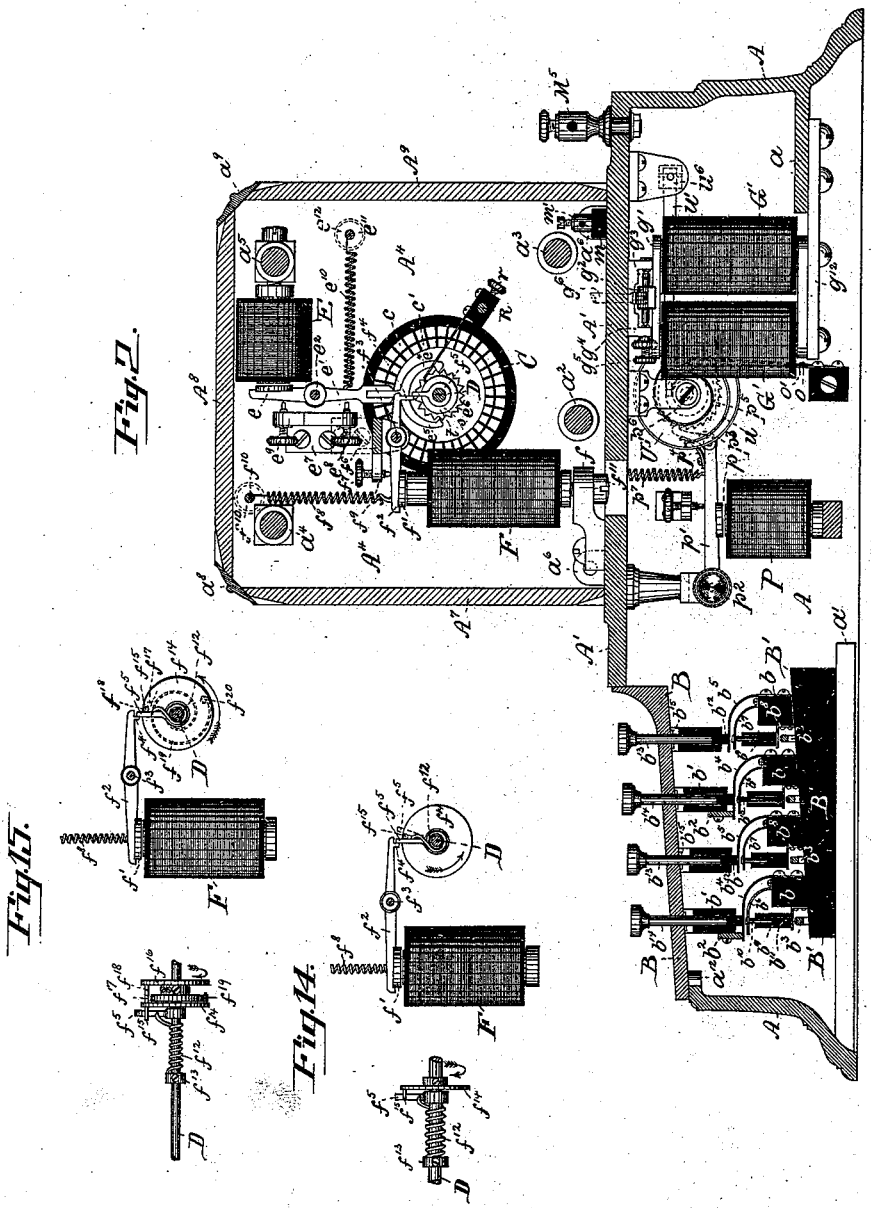
WITNESSES:
Hermann Bormann
Thomas M. Smith
INVENTOR.
Jacob H. Linville,
by J. Walter Douglass.
Atty.

(No Model.) 12 Sheets—Sheet 3.
J. H. LINVILLE.
PRINTING TELEGRAPH.
No. 377,763. Patented Feb. 14, 1888.
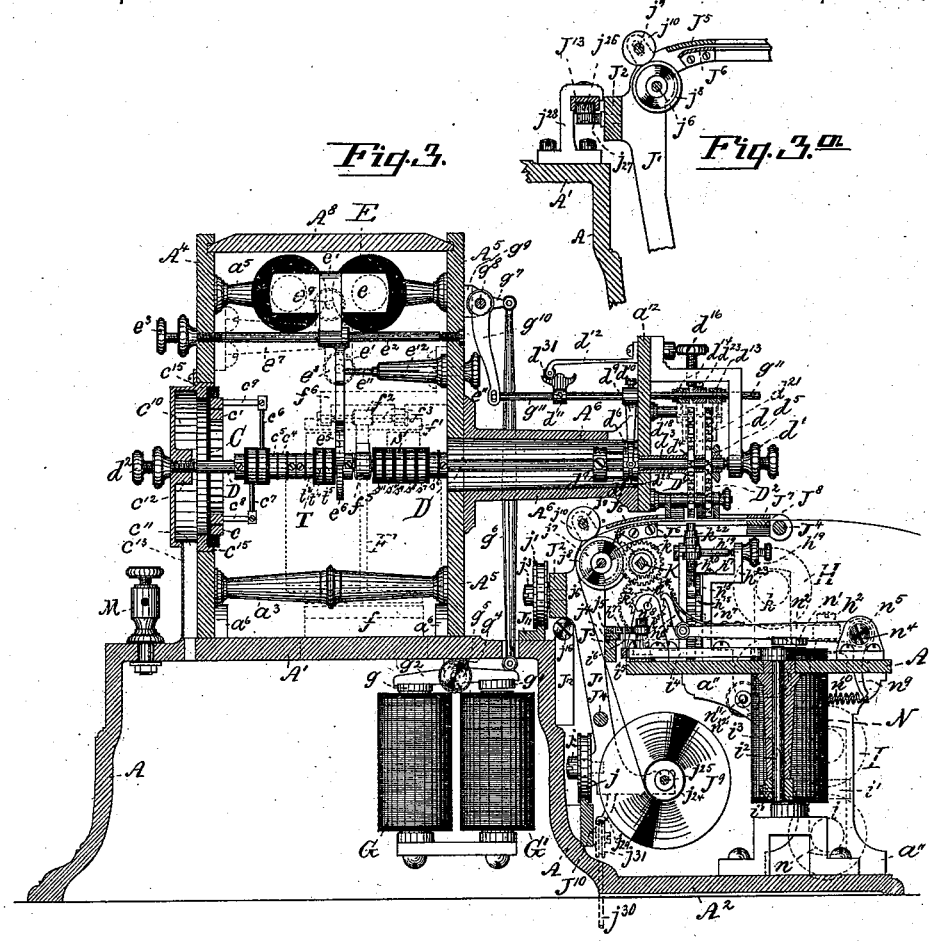
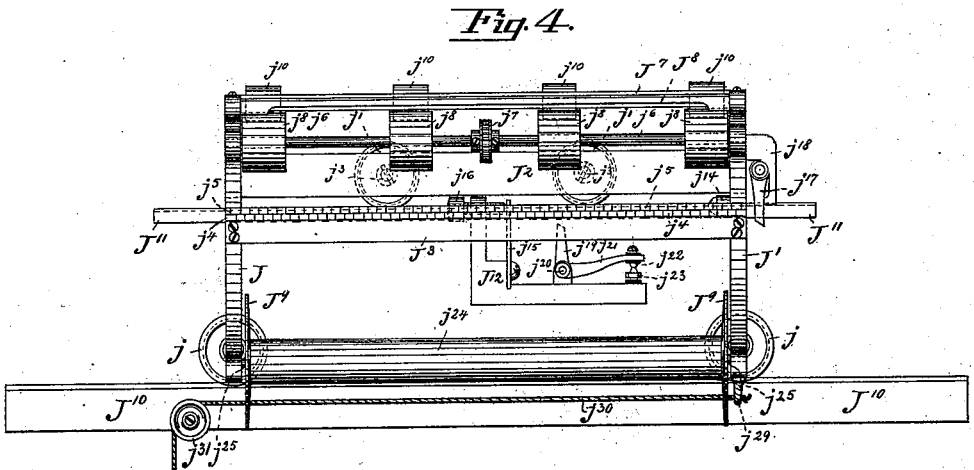
WITNESSES:
INVENTOR.

(No Model.) 12 Sheets—Sheet 4.
J. H. LINVILLE.
PRINTING TELEGRAPH.
No. 377,763. Patented Feb. 14, 1888.
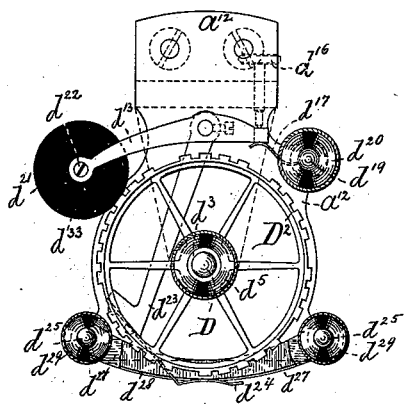
Fig. 6.
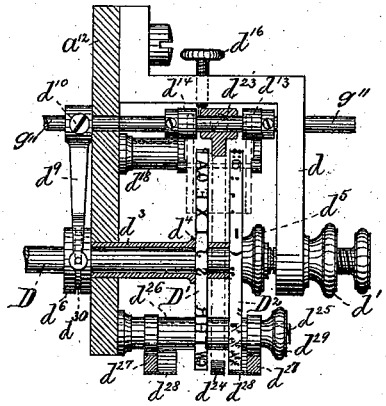
Fig. 7.
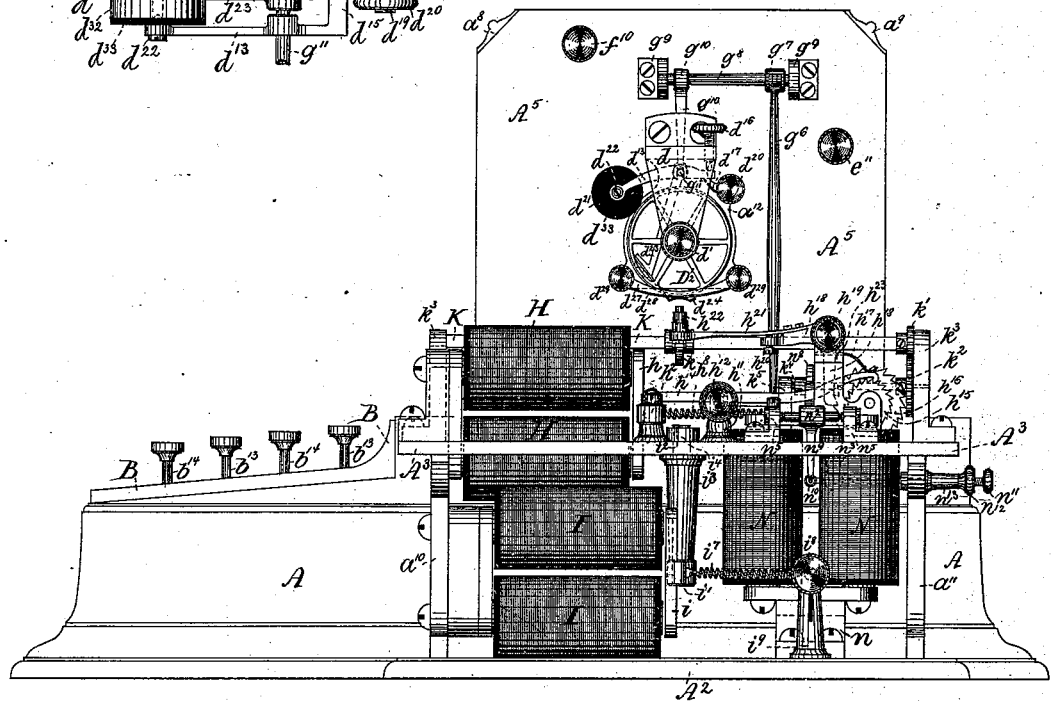
Fig. 8.
Fig. 5.
WITNESSES.
Hermann Bormann.
Thomas M. Smith.
INVENTOR.
Jacob H. Linville,
by J. Walter Douglass.
Atty.

(No Model.)  J. H. LINVILLE.  12 Sheets—Sheet 6.
PRINTING TELEGRAPH.

No. 377,763. Patented Feb. 14, 1888.

WITNESSES: INVENTOR.

(No Model.)

J. H. LINVILLE.
PRINTING TELEGRAPH.

No. 377,763. Patented Feb. 14, 1888.

WITNESSES:

INVENTOR:

(No Model.)   J. H. LINVILLE.   12 Sheets—Sheet 12.
PRINTING TELEGRAPH.
No. 377,763.   Patented Feb. 14, 1888.

WITNESSES.   INVENTOR.

UNITED STATES PATENT OFFICE.

JACOB H. LINVILLE, OF PHILADELPHIA, PENNSYLVANIA.

PRINTING-TELEGRAPH.

SPECIFICATION forming part of Letters Patent No. 377,763, dated February 14, 1888.

Application filed August 18, 1887. Serial No. 247,236. (No model.)

*To all whom it may concern:*

Be it known that I, JACOB H. LINVILLE, of the city and county of Philadelphia, in the State of Pennsylvania, have invented certain new and useful Improvements in Printing-Telegraphs, of which the following is a specification.

My invention relates especially to that class of printing - telegraphs which operate automatically as transmitters or as receivers by electrical pulsations sent from any instrument organized as a transmitter or from a central-station pulsator over a conductor connected with one or more instruments organized as receivers when the printing by the transmitters and receivers is controlled by any instrument in the line operating as a transmitter. The organization of the instruments and circuits is such as to adapt them to a complete system of communication between business offices, either in direct connection by private wires or connected through a central station.

The instruments operate with single-line conductors and local batteries or with two conductors dispensing with local batteries, with or without central-station pulsators and without the employment of alternating currents of reverse polarity.

My invention further relates to improvements in apparatus described in Letters Patent No. 368,217, dated August 16, 1887, for presenting the paper in page form from a continuous roll to the type-wheels, in devices for preventing impressions from one type-wheel while printing from the other, and in the circuits employed to unison the type-wheels to effect impressions, and to signal to the operator at a transmitter the movement of the paper-carriage of a receiver; and my invention further relates to improvements in electromagnetic and mechanical devices and in the arrangement of the electric circuits, by means of which any operator is enabled to individualize the receivers on a single-line conductor and send a message to any receiver or to any number of receivers in a series or otherwise connected.

My invention consists, first, in the peculiar construction of a table of contacts or sunflowers consisting of two annular series of insulated metallic segments, each series equal in number to the divisions of the type-wheels, placed concentric with the type-wheel shaft and traversed by brushes secured to metallic hubs on the type-wheel shaft and insulated therefrom, and in the connection of these segments with the respective lines through the electrical devices and the insulated contact-springs controlled by the keys of a key-board. Insulated contact-springs in electrical connection, respectively, with the main-line type-wheel and printing circuits and a source of electrical energy bear on the insulated metallic hubs on the type-wheel shaft, connecting thereby the line-circuits with the brushes and segments of the sunflowers. One of these series of segments insulated from one another is in connection with the type-wheel circuit by a conductor from each segment to alternately open and closed circuit springs operated by the stems of the keys of the key-board, except in one instance, where three consecutive contacts are connected to the closed-circuit springs of the key-board, as in my previous patent hereinbefore referred to. The open-circuit springs connected to one series of segments are connected to the type-wheel line and conversely the closed-circuit springs are disconnected from this line by the depression of their respective keys, which simultaneously close the printing-line circuit normally open through the other series of segments and through their circuit-springs corresponding to each division of the type-wheels. The pulsations in the former main line operate in the instrument organized as a transmitter through a neutral electro-magnet, its armature, and retracting-spring to vibrate wedge-pallets secured to the armature-lever, and thereby drive a star-wheel attached to the type-wheel shaft, automatically making and breaking alternately the main-line circuit at the sunflower-segments and through the successive open and closed circuit contact-springs of the key-board until a contact-brush reaches a segment connected to a depressed key and contact-spring, whereby the alternation of makes and breaks of circuit is interrupted, and the type-wheel is arrested in consequence of the brush encountering two consecutive makes or breaks of circuit. The pulsations sent to line operate through similar electro-magnetic devices and escapements to drive in unison the type-wheels of the receiver at which the main-line circuit must be switched around the sunflowers and contact-springs of the keys.

My invention consists, secondly, in so organizing the circuits that when a central-station pulsator is included in circuit the type-wheel line through such pulsator is switched around the sunflower and contact-springs of the key-board at both the transmitters and receivers; but the printing-line is switched around the sunflower and contact springs of the key-board only at receivers, and operates through the contact-springs at the key-board of a transmitter, when the circuit of the printing-line is closed by a brush contacting with a segment of the printing-line sunflower in electrical connection with the contact-spring depressed by a key, to arrest the central-station pulsator by an electro-magnetic detent in the circuit of the printing-line. The main batteries are located at the central station with suitable indicators, signaling devices, switch-boards, and connections to subscriber lines and instruments, to enable the subscribers to signal the central office and the attendant to connect in circuit any instruments on the respective lines. When only two instruments are in communication—as between business offices—the batteries may be located at any point on the lines connecting these instruments.

My invention consists, thirdly, in so organizing the instruments and circuits that they will operate to effect automatic unison and printing by means of directors and correctors, as shown and described in my previous patent hereinbefore referred to, when the escapement electro-magnets actuate wedge-pallets in response to alternate makes and breaks of circuit in the type-wheel line, and when the printing is effected by a separate printing main line closed through contacts on the director, or, in the absence of a printing-line, by local battery-circuits closed by the director, when the type-wheels are arrested by two consecutive makes or breaks of circuit in the type-wheel line.

My invention consists, fourthly, in the regulation of the speed of the instruments operating automatically by including in the type-wheel main line an electro-magnet actuated by pulsations in said circuit and closing the line by which it is actuated in parallel circuit through an escapement electro-magnet.

My invention consists, fifthly, in the permanently-fixed guards inclosing the face of the type-wheel not employed in giving impressions and a printing-spring located between the type-wheels and adjustable to and shifted laterally by the rod which shifts the type-wheels.

My invention consists, sixthly, in a signalizing device operating not only through the type-wheel line, as in my previous patent hereinbefore referred to, but also through the printing-line when an electro-magnet operating a detent is embraced in the circuit of the printing-line.

My invention consists, seventhly, in the individualizing of instruments connected in series by means of direct currents sent over the type-wheel line, whereby the type-wheel and director are stopped at the "cut-out" division of the type-wheels, in which position of the director a branch line of the printing-circuit operates a circuit-disk, moving it one step for each revolution of the type-wheel. The electro-magnets for effecting the printing, for feeding the paper, releasing the paper-carriage, and shifting the type-wheels are in the printing-circuit. The disks are so arranged in the several instruments in series that they are first placed in unison. The unison-latch is released by the next revolution of the type-wheel, stopping at, say, a shifting position of the type-wheels. Then each successive revolution of the type-wheels, stopping at cut-out division, will cut out all the electro-magnets in the printing-circuits excepting the electro-magnet in the branch circuit, operating to rotate the disks and bring into circuit the electro-magnet in the printing-circuit of the instrument numbered 1. A second revolution cuts out No. 1 and brings into circuit the instrument numbered 2, and so on in succession. A switch in the local circuit of the instrument from which the cut-out is operated enables the operator to arrest the circuit closer of his instrument when it closes the local circuit until he brings into circuit the printing electro-magnets of the instrument on which he desires to record a message; and my invention consists, eighthly, in the peculiar arrangement of the apparatus by which actuating parts are plainly visible and the adjusting devices are rendered simple and easily accessible, and by which the paper is presented horizontally in a flat sheet below the type-wheels in a position convenient for manipulation and the inspection of the operator.

The nature and scope of my invention will be more fully understood by reference to the accompanying drawings, showing the same in a manner found practically efficient, and in which—

Figure 7:
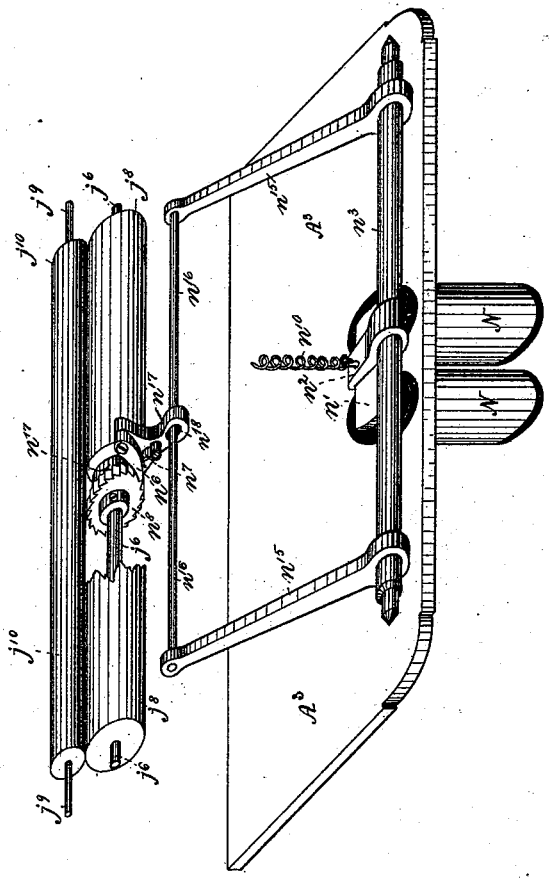
Figure 8:
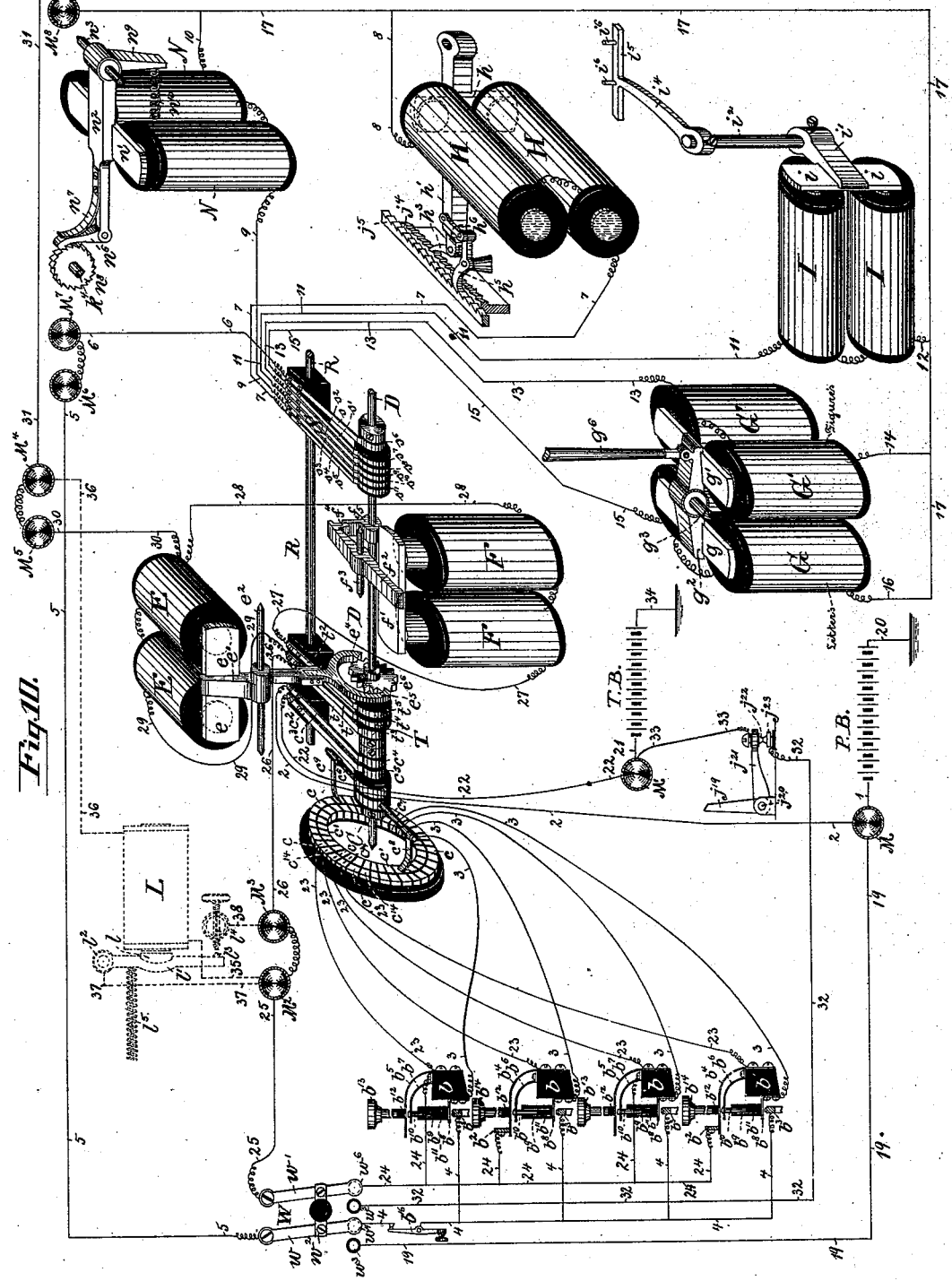
Figure 9:
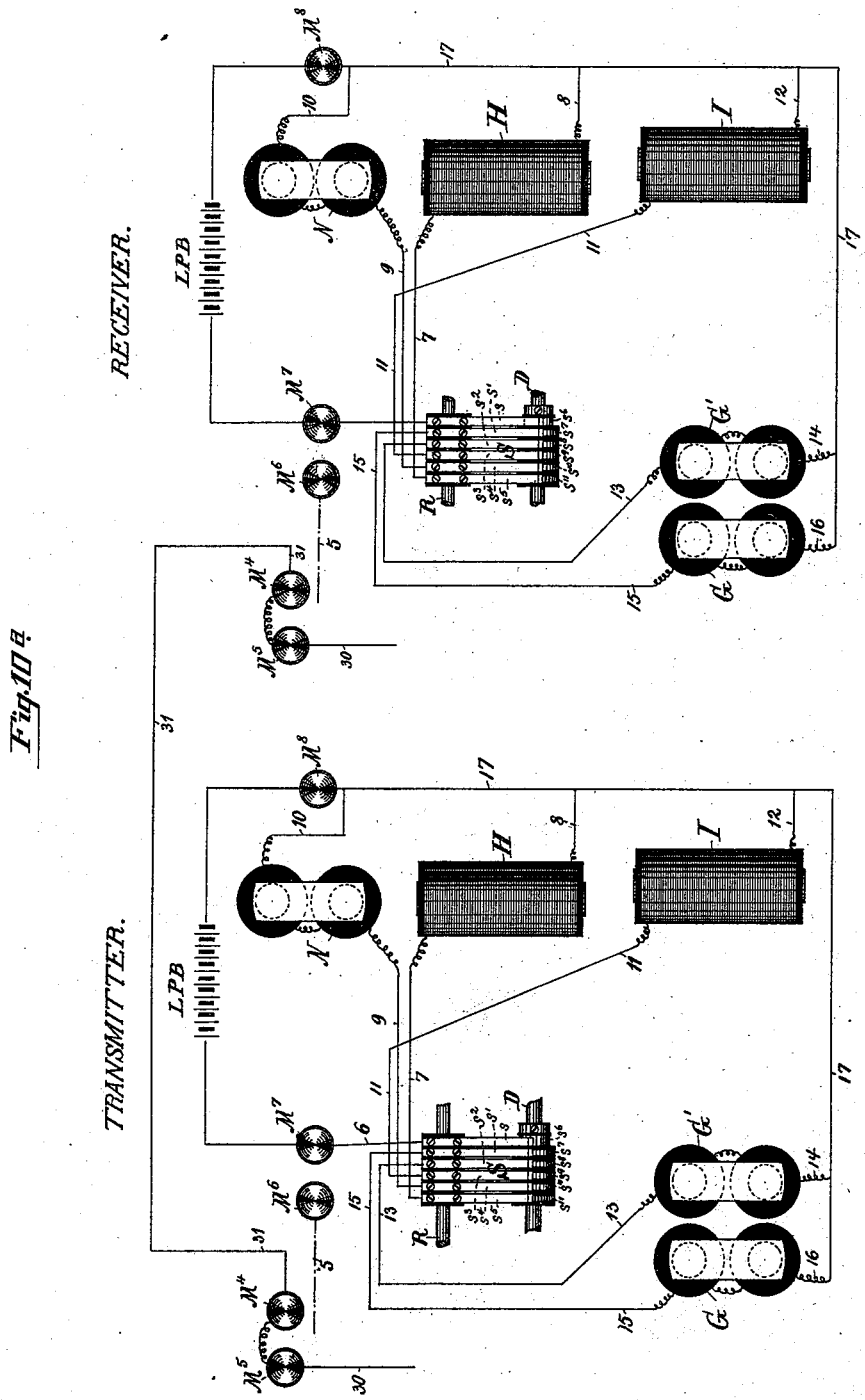
Figure 10:
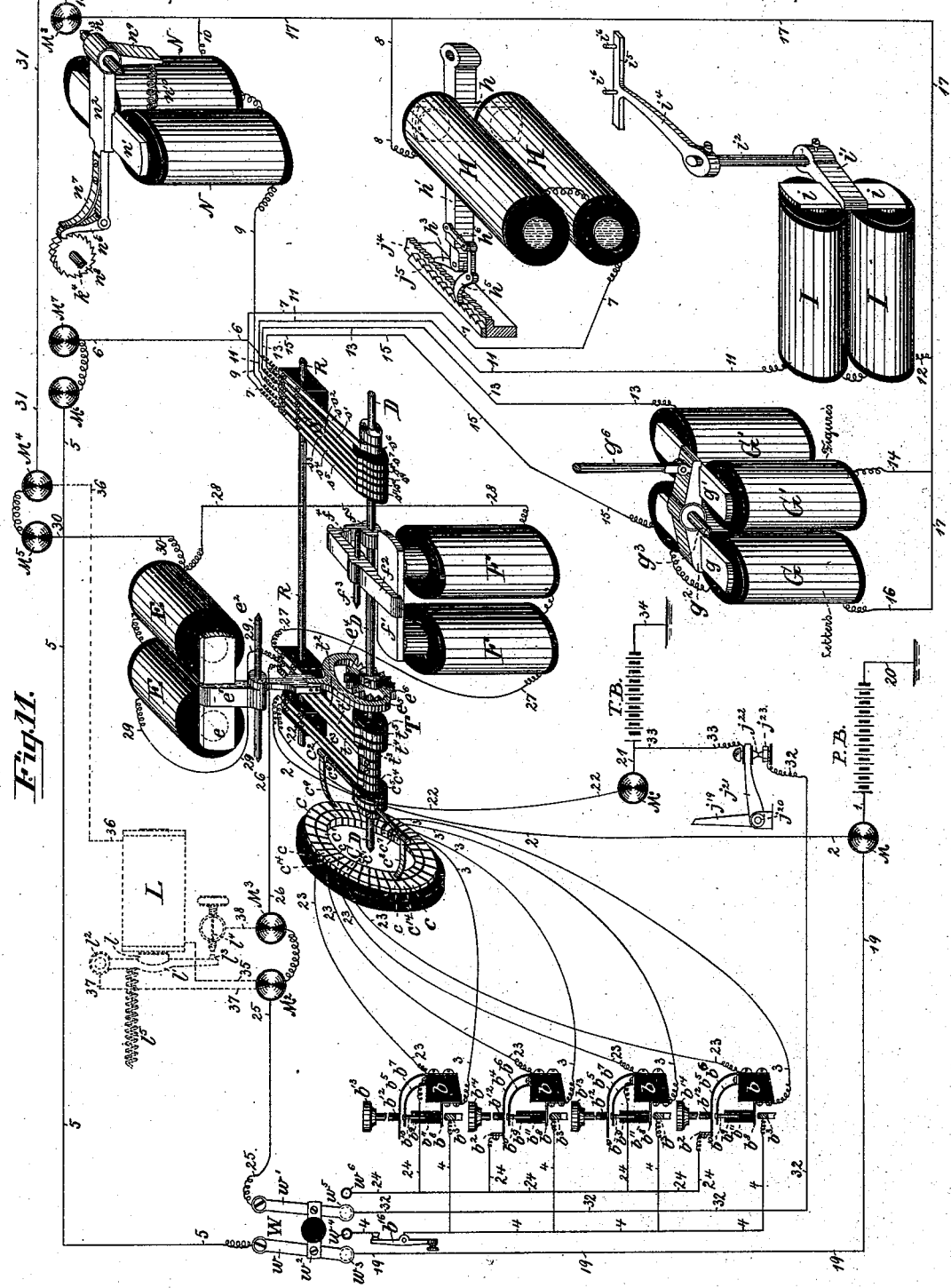
Figure 11:
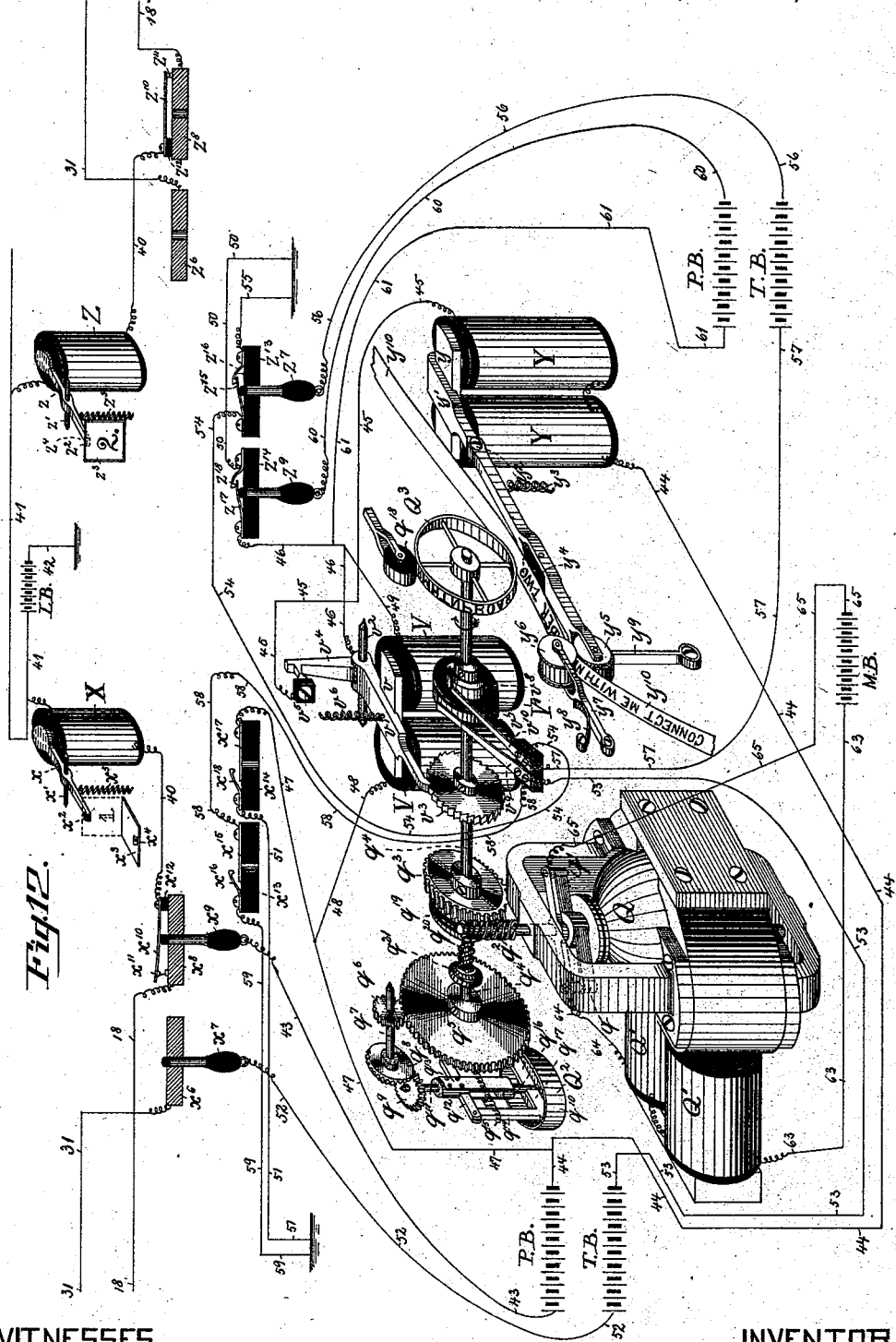
Figure 12:
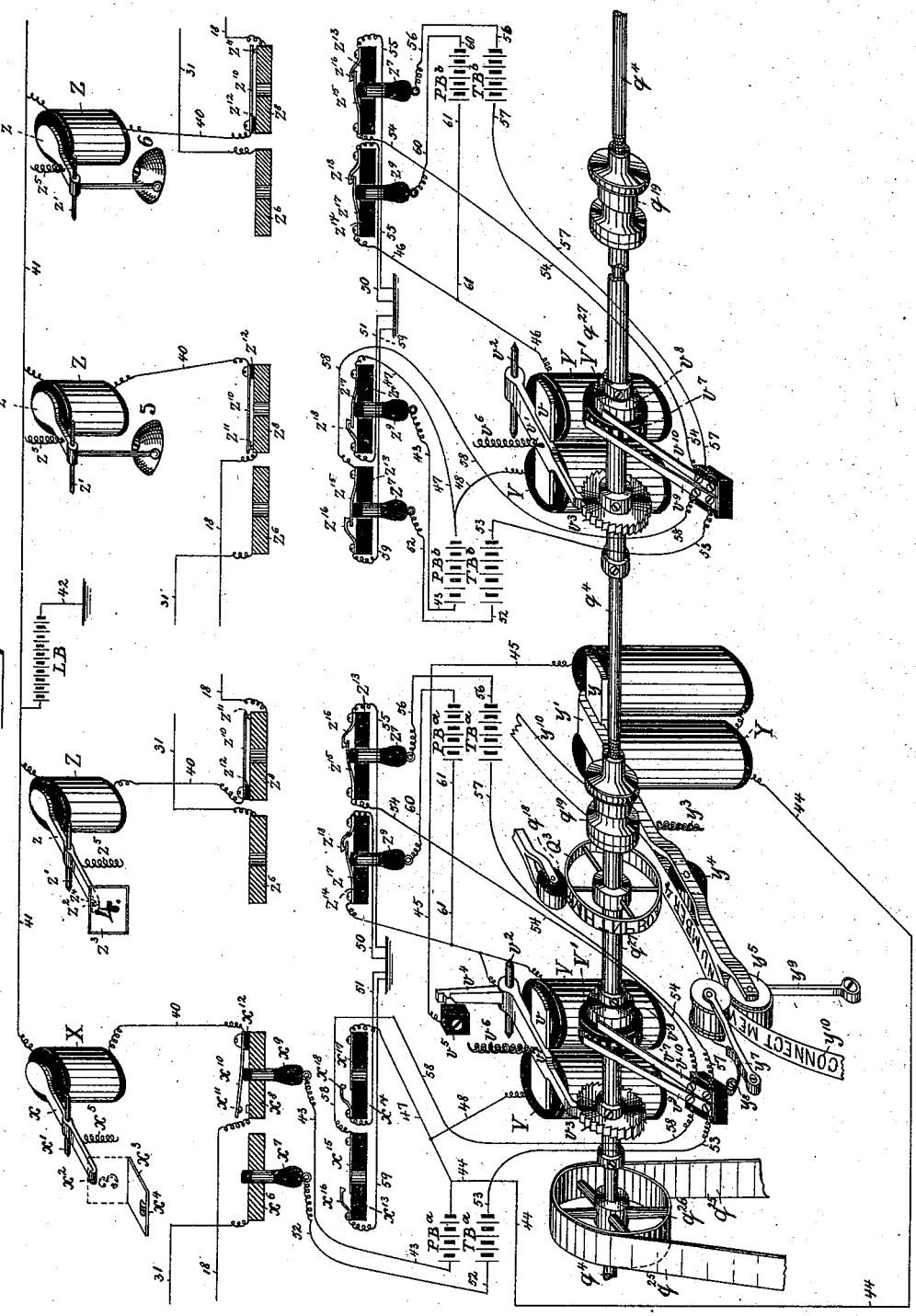
Figure 13:
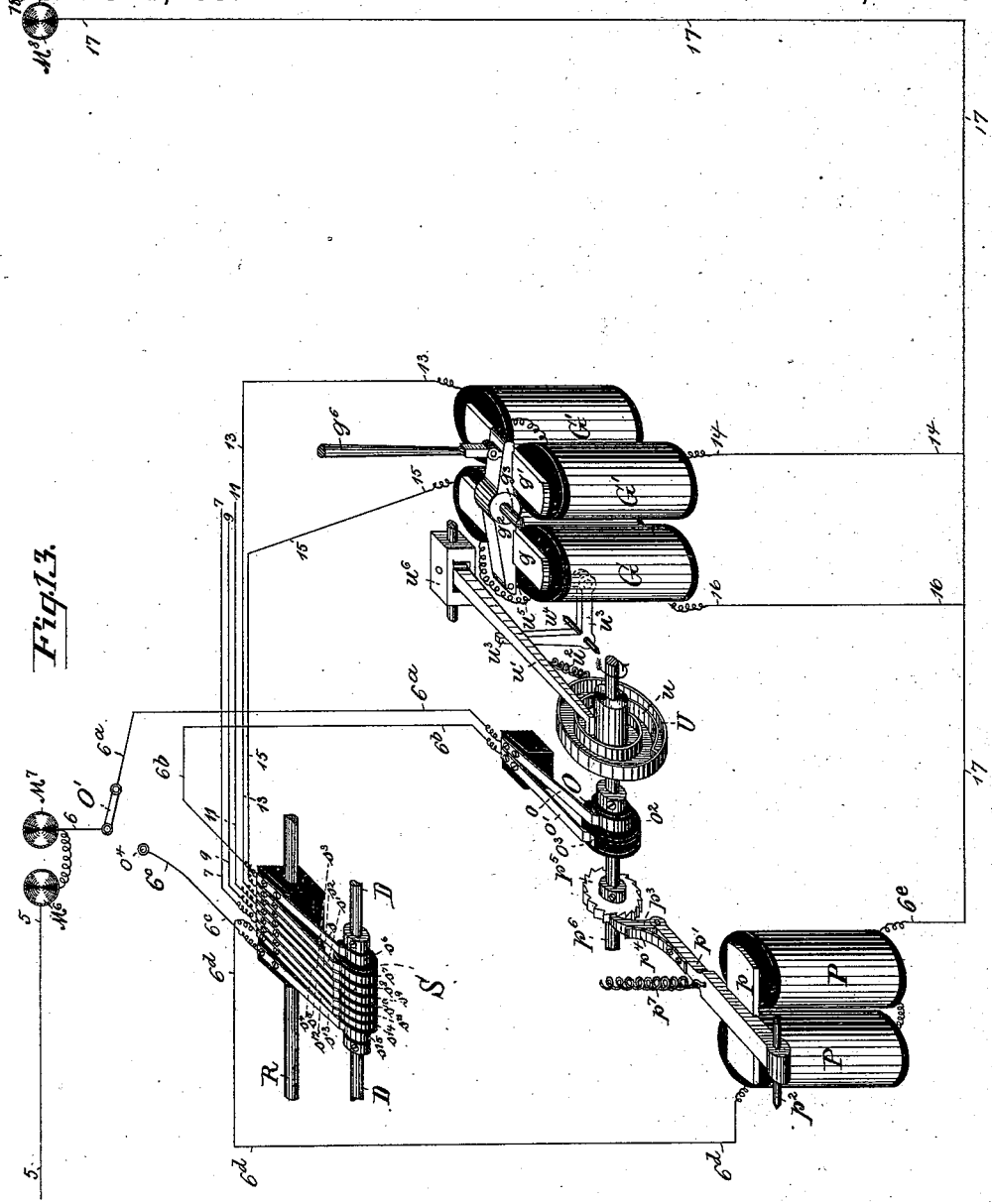

Figure 1 is a plan view of the key-board, main shaft, corrector, director, and circuit-springs, scape-wheel, and unison electro-magnet, and showing, also, a sectional view of the sunflower and a plan of the electro-magnets and devices employed in operating the paper-carriage. Fig. 2 is a longitudinal section through the printing-instrument, showing the key-anvils and contact-springs, the sunflower, escapement, unison, type-wheel, shifting and cut-out electro-magnets, and the devices operated thereby. Fig. 3 is a transverse sectional view through the printing-instrument and the paper-carriage, the section being taken through the center of the sunflower and arm carrying the type-wheel shaft, but exhibiting in side elevation the type-wheel shaft, corrector, director, and the hubs carrying the sunflower-brushes. Fig. 3ª is a sectional view of the paper-carriage, showing a modified form of guide-wheels. Fig. 4 is a side elevation of the paper-carriage racks, feed-rollers, signaling-spring, and back-stop to the paper-carriage. Fig. 5 is a side elevation of the printing-instrument, the table supporting the electro-magnets, and the devices operating therewith to effect the impressions to space between letters and lines and to release the paper-carriage. Fig. 6 is an end elevation, on an enlarged scale, showing the type-wheel support, ink-roller, curved guards for the type-wheels, L-shaped in section, and the arm carrying the printing-spring between the type-wheels. Fig. 7 is a detail view of Fig. 6, partly in section and partly in elevation, showing in section the sleeve carrying the type-wheels and in elevation the shifting-rod carrying the shifting-arm, the ink-roller, and the arm supporting the printing-spring. Fig. 8 is a top view of the ink-roller, its frame and connection with the shifting-rod, and the adjusting-spring for the ink-roller. Fig. 9 is a perspective view of the side projecting base-plate and table supporting the paper-carriage and feeding devices, showing, also, the electro-magnet for feeding between lines, the spacing-ratchets for spacing between letters, the ratchet and gear-wheels, and the shafts and rollers for feeding the paper to space between lines. Fig. 9ª is a perspective view of a modified form of means for operating the feed-rollers by a ratchet-lever. Fig. 10 is a diagrammatic view of the operative parts, the electro-magnets and switches, and the electrical circuits through the same when the instrument is organized as a transmitter, the portion of the drawing in broken lines illustrating an alternative arrangement when a relay is included in the circuit. Fig. 10ª is a diagrammatic view embracing similar portions of the circuits and electro-magnets shown in Figs. 10 and 11, and illustrating modifications of the circuits when local printing-batteries connected in the printing-circuit of a transmitter and a receiver are used in lieu of the main-line printing batteries and circuits. Fig. 11 is a diagrammatic view of the operating parts, the electro-magnets, and switches, and the electrical circuits through the same when the instrument is organized as a receiver, the portion of the drawing in broken lines illustrating an alternative arrangement when a relay is included in the circuit. Fig. 12 is a diagrammatic view, principally in isometric perspective, of a central-station apparatus, and shows the electrical circuits and devices for connecting the batteries through a central-station annunciator, pulsator, and printer with the main lines through subscriber-instruments. Fig. 12ª is a diagrammatic view, mainly in isometrical perspective, of a central-station apparatus, showing the electrical circuits and devices for connecting the batteries through the central station, audible and visible annunciator, electro-magnets, and a series of pulsators, detent and printing electro-magnets, and the several pulsators, ratchet and type wheels being frictionally connected to the same shaft and driven by a belt passing around a pulley rigidly secured to said shaft. Fig. 13 is an isometrical perspective view of the individualizing cut-out, showing the director, ratchet-wheel, and cut-out disks, the unison spiral, the ratchet electro-magnet, and the unison-latch and tripping devices therefor operated by the type-wheel-shifting electro-magnets. Fig. 14 is a detail of a unison-arm operated by a spring secured to the unison-arm and to the type-wheel shaft and stopped by a fixed disk and locked and released by the unison electro-magnet, the loose unison-arm and fixed disk being arranged to effect unison in one revolution. Fig. 15 is a detail of a unison device with a loose unison-arm and two disks on the type-wheel shaft, the loose unison-arm and loose disk being revolved by a spring secured thereto and to the type-wheel shaft and stopped by the disk fixed to the type-wheel shaft, effecting unison in two or less than two revolutions, the unison-arm being locked and released by the unison electro-magnet; and Fig. 16 is a plan and sectional elevation of a sunflower and its electrical devices and connections with the conductors through the impression and paper-feeding electro-magnets and the shifting and releasing electro-magnets, and which may be substituted in the instrument for the director and its electrical devices.

Referring to the drawings, A represents the base, to which the key-board B and the frame-plates $A^4$ $A^5$, containing the mechanism controlling the type-wheel shaft, are attached. Between the frame-plates $A^4$ $A^5$ are removable plate-glass slides $A^7$ $A^8$ $A^9$, held in position by the removable corner-strips $a^8$ $a^9$. By this means the delicate mechanism of the instrument is rendered plainly visible and easily accessible, and is also protected from dust or other extraneous matter and injury.

The key-board B, carrying the keys with their stems $b^{13}$ $b^{14}$, is removable from the case A. The plate B', of insulating material, carries the circuit-springs and anvils, and is secured to bearings $a'$ on the interior of the case A. The key-board contains keys engraved with letters and punctuation-marks, also with other characters and figures. The upper character on each key is found on the type-wheel containing letters of the alphabet, and the lower character on each key is found on the type-wheel containing figures. When the key marked "Letters" is depressed, the type-wheel containing letters is brought into position to print, and when the key marked "Figures" is depressed the type-wheel containing figures is placed in position to give the impression. The key marked "Feed" is depressed in order to feed the space between lines. The key marked "Release" is employed to release the paper-carriage, the key marked "Blank" to space between words, the key marked "Repeat" to duplicate letters, and the key marked "Cut-Out" to operate the individualizing apparatus. The unison-key need not be depressed. Its circuit-spring is attached to a conductor from the sunflower-segment, where three successive contacts are connected to the type-wheel line, for purposes to be hereinafter fully described.

From the frame-plate $A^5$ is projected horizontally a tubular arm, $A^6$, carrying the face-plate $a^{12}$, to which is secured, Figs. 6 and 7, the bracket $d$, supporting the bearings for one end of the type-wheel shaft D. The L-shaped guards consist of the bars $d^{27}$ and the plates $d^{28}$, fastened to sleeves $d^{26}$, through which pass stud-pins $d^{25}$, and the stud-pin $d^{19}$ passes through the sleeve $d^{18}$, to which is attached the spring $d^{17}$, and these several parts are suitably attached to the face-plate $a^{12}$. The other end of the type-wheel shaft D is supported by adjusting-screws in a removable cap, $c^{10}$, attached to the frame-plate $A^4$.

The sunflowers C are composed of metallic segments $c$ and $c'$, embedded in a disk of insulating material secured in a removable brass ring, $c^{15}$, fitted into the frame-plate $A^4$. The conductors from the sunflowers being carried down outside of the plate $A^4$ in a suitable casing, $c^{13}$, and connected to the contact-springs on the plate B', the removable cap $c^{10}$ and ring $c^{15}$ permit the sunflowers C to be detached from the plate $A^4$ without disturbing the electrical connections with these springs when it is necessary to remove the frames $A^4$ and $A^5$ from the base-plate A'.

The double sunflower C consists of two circles of metallic segments, $c$ and $c'$, equally spaced and concentric with the type-wheel shaft D. These segments are insulated from each other and from the supporting-ring $c^{15}$. The segments $c$ of the outer circle are alternately connected by the conductors 23, Figs. 10 and 11, to the open-circuit springs $b^5$, operated by the keys $b^{13}$ of the key-board, and to the closed-circuit springs $b^4$, operated by the keys $b^{14}$ of the key-board. The upper anvils, $b^2$, of springs $b^4$ are connected to the type-wheel line by short conductors 24, and the lower springs, $b^7$, forming anvils for the open-circuit springs $b^5$, are connected by short conductors 24 to the type-wheel line. In one instance three successive segments $c$ are connected with closed-circuit keys, and these segments must be connected successively with the unison-key and the preceding and following key, taking the connections in the numerical order of the segments. The segments $c'$ of the inner circle of segments are connected successively by conductors 3 to the springs $b^8$, the connections 3 from the inner circle of segments $c'$ being at a point diametrically opposite to the connections 23 from the outer circle of segments, $c$, in order that the brushes $c^8$ and $c^9$ may contact at the same time with the opposite segments $c'$ and $c$. The springs $b^8$, normally out of contact with the anvil-bars $b^3$, contact with these bars when a key corresponding to a spring $b^8$ is depressed. The anvil-bars $b^3$ are connected by short conductors 4 to the printing-line. It will be observed that the key-stems are tipped with insulating material, $b^{12}$, which bears on springs $b^4$ and $b^5$, and that insulating material, $b^{11}$, is interposed between the stems carried by the anvil-springs $b^6$ and $b^7$ and the springs $b^8$ in the printing-circuit. By these devices the type-wheel circuit and the printing-circuit are insulated from each other at the key-board, while both circuits are simultaneously closed when the brushes contact with segments connected with an open-circuit spring, $b^5$, and a printing-spring, $b^8$, which have been depressed, and the type-wheel line has been closed by the depression of an open-circuit key, and the printing-circuit only is closed when the brushes contact with segments connected with a closed-circuit spring, $b^4$, and a printing-spring, $b^8$, which have been depressed, and the type-wheel line has been broken by the depression of a closed-circuit key. The depression of a key changes the succession of open and closed circuit contacts in the outer circle of segments $c$, causing the type-wheel shaft to be arrested with the brush $c^9$, resting in contact with the segments connected with a spring belonging to the depressed key $b^{13}$ or $b^{14}$, as will be hereinafter explained. The metallic hub $c^5$ on the type-wheel shaft D is connected by the spring $c^2$ to the conductors 22 and 21, leading to the type-wheel battery T B, and is in electrical connection with the arm $c^6$ and brush $c^9$. The metallic hub $c^4$ on the same shaft is connected through the spring $c^3$ and conductors 2 and 1 to the printing-battery P B, and is in electrical connection with the arm $c^7$ and the brush $c^8$. The brushes, arms, and hubs in one line are insulated from the brushes, arms, and hubs in the other line and from the type-wheel shaft, and the springs $c^2$ and $c^3$ are supported at one end on insulating material.

During the revolution of the type-wheel shaft D and the brush $c^9$, which contacts successively with the outer segments, $c$, and the brush $c^8$, which contacts successively with the inner segments, $c'$, alternate makes and breaks of the type-wheel line-circuit of battery T B will occur, while the circuit of battery P B will remain normally open between the anvils $b^3$ and spring $b^8$ until a key is depressed. When the brush $c^9$ passes over the three segments $c$, connected successively to closed-circuit keys, a prolonged impulse will be sent over the type-wheel line, without, however, checking the regular progressive movement of the type-wheel shaft effected by the intervention of a corrector, as hereinafter more particularly described.

Rotary motion is imparted to the type-wheel shaft D, Fig. 2, by wedge-pallets $e^4$ and $e^5$, impinging on the V-shaped teeth of a star scape-wheel, $e^6$, secured to said shaft. The pallets are vibrated by the armature-lever $e'$, the armature $e$ being attracted by the escapement electro-magnet E when the type-wheel line is closed and withdrawn by the retracting-spring $e^{10}$ when the line is broken, and since such advance of the scape-wheel, driven by each pallet through a space equal to half a tooth, causes the brush $c^9$ to contact with a succeeding segment c, alternate makes and breaks of circuit will succeed each other, and the type-wheel shaft will continue to rotate automatically until the regular succession of impulses is interrupted by the depression of a key.

To prevent the prolonged impulses from three successive closed-circuit segments of the sunflower from arresting the type-wheel shaft, a corrector, T, is secured to but insulated from said shaft. The corrector consists of a metallic hub, $t^3$, and two metallic disks, $t^4$ and $t^5$, in electrical connection with said hub, but insulated from each other by the intervening disks of insulating material. The disk $t^4$ is indented only at one point, so that the type-wheel line-circuit through conductor 26, Figs. 10 and 11, spring $t$, hub $t^3$, disk $t^4$, spring $t'$, conductor 29, and escapement electro-magnet E will be interrupted for the period of one regular break of circuit when the disk $t^4$, with its indentation, passes under the spring $t'$. Directly opposite the indentation in the disk $t^4$, and immediately preceding said indentation, there occurs in disk $t^5$ a contact, and consequently the current entering by conductor 26 divides between the escapement electro-magnet E and the unison electro-magnet F, when the springs $t'$ and $t^2$ both bear on metallic contacts on the disks $t^4$ and $t^5$; but the entire current is shunted through the unison electro-magnet F by the spring $t^2$ and conductors 27 and 28 when the circuit through the escapement electro-magnet E is broken at the indentation in the disk $t^4$, the spring $t'$ then being clear of its metallic contact and riding on the insulated material of the disk.

The break of circuit through the electro-magnet E permits the advance of the type-wheel shaft, while the prolonged current of increasing intensity energizes the unison electro-magnet F, causing it to strongly attract its armature $f'$ and overcome the tension of the retracting-spring $f^3$. The spring $f^3$ is adjusted so as to resist the pull of the electro-magnet F when energized by pulsations of ordinary duration and intensity occurring during the regular alternate pulsations produced through the sunflower of a transmitter. When the armature $f'$ is attracted, the stop $f^4$ on the lever $f^2$ is withdrawn from the path of the unison-arm $f^5$, secured to and revolving with the type-wheel shaft D.

When the type-wheel shafts of both transmitter and receiver are revolving in unison, it follows that their respective unison electro-magnets F will be energized to withdraw the stops $f^4$ at precisely the same moment without arresting either type-wheel shaft; but if the type-wheel shaft of a receiver is not revolving in unison it will be arrested by the unison-stop until the brush $c^9$ of the transmitter passes two of the three successive closed-circuit contacts, and during the passage of the brush over these two closed-circuit contacts the prolonged current will occur, and while passing the first contact part of the current and while passing the second contact the entire current will be shunted through the electro-magnet F, thereby simultaneously releasing the unison-arms of the transmitter and receiver. This impulse of the full strength of the battery succeeding an impulse of less strength, serving to charge the electro-magnet E, cannot occur excepting at the unison position of the type-wheel shaft and the type-wheels of the transmitter, when the brush $c^9$ is passing two successive closed-circuit segments, and consequently the unison-arm of the receiver will be released only when the type-wheel shafts and type-wheels of the transmitter and receiver are in unison. Therefore, if at any period in a revolution the type-wheels of the respective instruments should fail to revolve in unison they will be automatically corrected during the next revolution of the transmitter.

The "corrector" T and the "automatic unison," operating in connection with a double-coil electro-magnet and polarized armature, are described and claimed in Letters Patent granted to me under date of August 16, 1887; but the corrector in said patent required an additional disk and contact-spring, and instead of effecting a break of circuit through the escapement electro-magnet, as in this application, the current was diverted from one coil to the other coil of the double-coil electro-magnets, thereby effecting vibration of the polarized armature, while a prolonged impulse of current of uniform intensity and of the duration of two regular impulses was shunted through the coils of the unison electro-magnet.

The director S, mounted on but insulated from the type-wheel shaft D, is similar in principle and general details to the director described and claimed in the aforesaid patent; but the arrangement of contact disks and springs is modified to adapt it to use in connection with a single-line conductor. The metallic hub $s^6$, Figs. 1, 3, 10, and 11, extends through the corrector and is in contact with the metallic disks $s^7$, $s^8$, $s^9$, $s^{10}$, and $s^{11}$, and these metallic disks are separated by disks of insulating material, on which the contact-springs $s'$, $s^2$, $s^3$, $s^4$, and $s^5$ ride when indentations occur in the respective metallic disks. The hub $s^6$ is insulated from the type-wheel shaft D by a sleeve and from the adjoining hub with a set-screw attachment by a collar of insulating material. There are as many short contacts distributed on and among the five metallic disks as there are divisions in one circle of segments in the sunflower, or the aggregate number of contacts is equal to the number of characters and spaces on a type-wheel. An additional contact is, however, introduced on the disk $s^{11}$ on the same radial line with the contact on this disk, for a purpose to be hereinafter more fully explained. The contacts are very short, and the insulating-spaces are extended; but both are uniformly spaced around the peripheries of the metallic disks. Three contacts that would fall at the regular subdivisions of the director are omitted at suitable intervals on the metallic disk $s^{11}$, used to direct the printing-circuit, and opposite these intervals is provided a single contact in required order in each of the metallic disks $s^7$ and $s^8$, and only one contact-spring can impinge at one time on a contact in the disks $s^7$, $s^8$, and $s^{11}$ at any point in the revolution of the director; but when a contact on the disk $s^9$ falls under a spring, $s^3$, the supplemental contact on the disk $s^{11}$ falls under the spring $s^5$, closing the parallel circuit through the conductors 7 and 11 and electro-magnets H and I. When the type-wheel shaft is arrested with the contact-spring $s^5$ resting on a contact on the disk $s^{11}$, the current entering by the conductor 6, spring $s$, and hub $s^6$ passes by the disk $s^{11}$, spring $s^5$, and conductor 7 through the coils of the impression electro-magnet H, employed to effect the step-by-step movement of the paper-carriage and to operate the impression devices. When the spring $s^4$ of a contact rests on the disk $s^{10}$, the current is directed through the conductor 9 and the coils of the paper-feeding electro-magnet N. When the spring $s^3$ rests on a contact on the disk $s^9$, a portion of the current is directed through the conductor 11 and the coil of the electro-magnet I, employed to release the pawl $h^3$ and dog $h^7$, Fig. 1, from the rack $j^4$ of the paper-carriage. This portion of the current in the parallel circuit energizes the electro-magnet I, causing it to attract its armature $i$, and, by means of the armature-lever $i'$, revolve the shaft $i^2$, swing the lever $i^4$, carrying the pins $i^6$, against the pawl $h^3$, at the same time, by means of a pin, $i^6$, releasing the dog $h^7$ from the rack $j^4$. The current in the other branch of the parallel circuit, through a contact in the disk $s^{11}$, spring $s^5$, and conductor 7, at the same moment energizes the electro-magnet H, causing the armature $h$ to be attracted, and the lever $h'$ is thereby drawn forward and the pawl $h^3$ carried thereby, and, bearing against the pin $i^6$, is detached from the rack $j^4$, and the counter-pawl $h^5$, connected to said lever by the link $h^6$, is revolved clear of the counter-rack $j^5$. The paper-carriage is then free to return to its initial position.

When the spring $s^2$ rests on a contact on the disk $s^8$, the current is directed through the conductor 13, and the coils of the electro-magnet G', attracting its armature $g'$ and causing the type-wheel $D^2$, containing figures and punctuation-marks, to be shifted into position to give impressions, and when the spring $s'$ rests on a contact on the disk $s^7$ the current is directed through the electro-magnet G by the conductor 15, causing its armature $g$ to be attracted and the type-wheel $D'$, containing alphabetical characters, to be shifted into position to give impressions. To avoid the friction of numerous contact-springs on the metallic disks of the director, I prefer to employ a sunflower, Fig. 16, arranged concentric with the type-wheel shaft D, the metallic segments being regularly spaced, and in number equal to those of each series in the sunflower C. The segmental contacts are narrow, and those employed to direct the current through the conductor 7 are all connected to said conductor, while the remaining contacts are connected successively, as shown, to the respective conductors, 9, 11, 13, and 15, and through the respective electro-magnets in their order, and for the purposes as hereinbefore set forth in reference to the director S.

The apparatus for shifting the two type-wheels $D'$ and $D^2$ will now be described.

The type-wheels are rigidly secured to a sleeve, $d^3$, Figs. 3, 6, and 7, moving freely on the type-wheel shaft D. The sleeve $d^3$ terminates at its inner extremity in a grooved collar, $d^5$. The arm $d^9$, bifurcated at one end, embraces the collar $d^5$, and pins through the extremities of the bifurcated arms engage in the groove $d^{30}$ of the collar $d^5$. The other extremity of the arm $d^9$ is secured to the shifting-rod $g^{11}$ by the set-screw $d^{10}$. The shifting-rod $g^{11}$ slides freely through the face-plate $a^{12}$ and the bracket $d$, and is jointed at one end to the lever $g^{10}$. The lever $g^{10}$ is secured to a rock-shaft, $g^8$, pivoted in brackets on the frame-plate $A^5$, and from a right-angled lever, $g^7$, secured to the rock-shaft $g^8$, depends the connecting-rod $g^6$, pivoted to the armature-lever $g^2$ of the shifting electro-magnets G and G'.

When the electro-magnet G is energized, its armature $g$ is attracted and the letter-wheel $D'$ is shifted into position, as shown in Fig. 3, to give impressions. When the electro-magnet G' is energized, its armature $g'$ is attracted and the figure-wheel $D^2$ is shifted into position to give impressions. An arm, $d^{11}$, with two concave recesses in its upper surface, is secured to the shifting-rod $g^{11}$, and a spring, $d^{12}$, attached to the face-plate $a^{12}$, carries pivoted in its extremity a roller, $d^{31}$, which engages in one of the recesses in the arm $d^{11}$ whenever the type-wheels are shifted into position, and thereby firmly maintains the type-wheels in correct position to give their impressions in one and the same straight line. The ink-roller frame $d^{13}$ and $d^{14}$ is loosely pivoted between fixed collars on the shifting-rod $g^{11}$, and carries between one extremity of the frame the ink-roller $d^{21}$, and at its other extremity the sides of the frames $d^{13}$ and $d^{14}$ are connected by a flat plate, $d^{15}$, against which an adjustable spring, $d^{17}$, bears, in order to regulate the pressure of the ink-roller on the type-wheels. The plate $d^{15}$ impinges against an adjusting-screw, $d^{16}$, when the ink-roller passes over blank spaces on the type-wheels. The ink-roller $d^{21}$, suitably mounted on a spindle, $d^{34}$, consists of fine felt, $d^{32}$, punched out in circular form and compressed between the flanges $d^{33}$ of the ink-roller $d^{21}$. The ink-roller frame, being secured between fixed collars on the shifting-rod $g^{11}$, will be shifted simultaneously with the type-wheels without the aid of frictional contact therewith.

The printing-spring $d^{24}$ is adjustably attached to an arm, $d^{23}$, located between the type-wheels $D'$ and $D^2$, and is rigidly secured to the shifting-rod $g^{11}$. The spring $d^{24}$ is thereby held in central position between the type-wheels and is shifted simultaneously with the type-wheels.

To prevent impressions from the type-wheel not in use, curved guards, consisting of bars $d^{27}$ and plates $d^{28}$, forming a combination L-shaped in cross-section, are secured to the face-plate $a^{12}$ by stud-pins $d^{25}$ and nuts $d^{29}$. The vertical bars $d^{27}$ of the guards are made of requisite strength to support the thin horizontal flanges $d^{28}$ and maintain their form against the pressure of the paper when struck by the printing-hammer $h^{22}$. The horizontal flanges $d^{28}$ are made very thin to permit the paper to lie close to but out of contact with the type-wheels. The guards $d^{27}$ and $d^{28}$ are so located with reference to the type-wheels that the type-wheel in position to receive the impressions is in a vertical plane midway between the edges of the flanges of the guards, while the idle type-wheel is in the recess formed by the flange $d^{28}$ and bar $d^{27}$ of one of the guards, and impressions can consequently be given from the exposed type-wheel only.

The paper-carriage carrying flat sheets of paper to receive the impressions is supported on the wheels $j$ and $j'$, running on the tracks $J^{10}$ and $J^{11}$, attached to the base A, Figs. 3, 4, and 9. I prefer to omit the wheels $j'$ and track $J^{11}$, and to substitute therefor the vertical rolls $j^{26}$, Fig. 3$^a$, turning on stud-pins held in brackets $j^{27}$, attached to the bar $J^2$. The rollers $j^{26}$ bear against the flanges of the inverted channel-bar $J^{13}$, which is firmly held in position by the brackets $j^{28}$, secured to the base-plate A', and offer rolling friction only to the movement of the paper-carriage when driven forward by its rack or returned by the action of a spring or weight, $j^{32}$.

The mechanism employed to control the printing-hammer and paper-carriage and to space between letters and lines is mainly attached to a table, A$^3$, supported on brackets $a^{10}$ and $a^{11}$, secured to the base-plate A$^2$, extending from the side of base A.

Side frames, J and J', rising vertically and curved so as to extend horizontally below the type-wheels, support loosely in their lower horizontal extensions a shaft, $j^{25}$, carrying a spool, $j^{24}$, on which the roll of paper is wound, and is held between the flanges J$^9$. The side frames are braced by the bar J$^3$, supporting the rack $j^4$, and the counter-rack $j^5$ by the bar J$^2$, supporting the wheels $j'$ by the paper-guides J$^6$ and J$^7$ and the rod J$^4$. The feed-rollers $j^8$ are secured at intervals on a shaft, $j^6$, turning freely in bearings in the side frames, J and J'. The pressure-rollers $j^{10}$ are secured directly opposite the feed-rollers on a shaft, $j^9$, turning freely in bearings in the ends of the pivoted links $j^{11}$, and their function is to press the paper firmly against the feed-rollers under the action of adjustable springs $j^{12}$, secured to the link $j^{11}$ and to the side frames, J and J'. A double-flanged pinion, $j^7$, is mounted on the shaft $j^6$ at its center and gears into a pinion, $k$, sliding freely on the angular shaft K, or the pinion may be feathered to a circular shaft. The shaft K turns in bearings $k^3$, attached to the table A$^3$, and the pinion $k$ slides freely on the shaft K, and is moved longitudinally thereon by the flanged pinion $j^7$, as the paper-carriage travels laterally.

A pinion, $k'$, secured at the end of the shaft K, engages in the driving-pinion $k^2$, mounted on the shaft $k^4$, turning in bearings $k^3$ and $k^5$, supported on the table A$^3$. This shaft $k^4$ carries a ratchet-wheel, $n^8$, into which engages the hook-pawl $n^6$ on the lever $n^2$, to which is attached the armature $n'$ of the paper-feeding electro-magnets N. The lever $n^2$ is supported in bearings $n^4$ and $n^5$, and has a right-angular extension, $n^9$, at its rear end, to the extremity of which is attached its retracting-spring $n^{10}$. A stop, $n^{14}$, limits the backward throw of the lever $n^2$, and a spring, $n^7$, maintains the hook-pawl $n^6$ in contact with the ratchet-wheel $n^8$.

When the electro-magnet N is energized, it attracts its armature $n'$, causing the ratchet-wheel $n^8$ to revolve one notch, and thereby, through the intervention of the gearing, shafts, and feed-rollers just described, feed the paper horizontally between the guides J$^6$ and J$^7$ the space between two lines of the impressions.

A greatly-simplified and equally effective apparatus for feeding the sheet of paper between lines of the impression at any point in the excursion of the paper-carriage is illustrated in Fig. 9$^a$, in which $j^8$ represents the feed-roller, preferably of vulcanized rubber, mounted on a shaft, $j^6$, which has its bearings in side bars, J and J', Fig. 9. The pressure roller $j^{10}$, mounted on a shaft, $j^9$, may be of rubber or of wood or other suitable material, the shaft $j^9$ being supported in the bearing $j^{11}$, Fig. 9. A ratchet-wheel, $n^8$, is secured to the shaft $j^6$ near its center, and the ratchet-lever $n^{17}$ turns loosely on a hub secured to the side of the ratchet-wheel $n^8$. The ratchet-lever $n^{17}$ carries a pawl, $n^6$, held against the ratchet-wheel $n^8$ by a spring, $n^7$. Through the extremity of the ratchet-lever $n^{17}$ is an oblong hole, $n^{18}$, so proportioned as to give a constant bearing on the rod $n^{16}$, and provided for sliding motion due to the angular motion of the ratchet-lever $n^{17}$ and rod $n^{16}$. The rod $n^{16}$ is rigidly held in the extremities of the arms $n^{15}$, which are firmly secured on the rock-shaft $n^3$, mounted in supports attached to the table A$^3$. The armature $n'$ of the paper-feeding electro-magnet N is attached to the lever $n^2$, secured to the rock-shaft $n^3$. When the electro-magnet N is energized, it attracts its armature $n'$, thereby revolving the rock-shaft $n^3$ and drawing downward the rod $n^{16}$, whereby the ratchet-lever $n^{17}$ is drawn downward, and, by the intervention of the pawl $n^6$, revolves the feed-roller $j^8$ a space equal to one notch in the ratchet-wheel $n^8$. The relative movements and proportions of the levers, arm, and ratchet-teeth, and the feed-roller are such as to feed the paper forward the space between two lines of the impression. The length of the rod $n^{16}$ between the arms $n^{15}$ is sufficient to permit the rollers $j^8$ and $j^{10}$ to traverse a distance equal to the length of the printed lines, and the paper can therefore be fed thereby at any point in the excursion of the paper-carriage.

The rack electro-magnet H is supported by the table $A^3$. Its armature $h$ is attached to the lever $h'$, in the extremity of which is pivoted a pawl, $h^3$, pressed by a spring, $h^4$. A link, $h^6$, connects the lever $h'$ with the counter-pawl, $h^5$, which is pivoted near its center on a stud-bolt screwed into a post rising from the table $A^3$. The printing-hammer $h^{22}$, Figs. 1, 3, and 5, is mounted on an adjustable elastic arm, $h^{21}$, attached to the bell-crank lever $h^{18}$, which is supported on trunnions $h^{19}$, bearing in supports $h^{23}$, rising from the table $A^3$. A small ratchet-wheel, $h^{15}$, and a larger ratchet-wheel, $h^{16}$, are mounted on the same shaft side by side, and this shaft turns in bearings in the supports $h^{23}$.

A horizontal arm, $h^{14}$, terminating in a hook-pawl at one extremity, engages in a tooth of the smaller ratchet-wheel, $h^{15}$, and at its other extremity the arm $h^{14}$ is pivotally connected to the lever $h'$. A spring, $h^{17}$, maintains the hook on the arm $h^{14}$ in contact with the ratchet-wheel $h^{15}$, and the printing-hammer $h^{22}$, aided, if found necessary, by a retracting-spring, (not shown,) maintains the bell-crank lever $h^{18}$ in contact with the ratchet-wheel $h^{16}$.

When the electro-magnet H is energized, it attracts its armature $h$, thereby drawing back the lever $h'$, engaging the pawl $h^3$ in another tooth of the rack $j^4$, and swinging the counter-pawl $h^5$ out of engagement with the counter-rack $j^5$. The same movement of the lever $h'$ causes the arm $h^{14}$ to revolve the ratchet-wheels $h^{15}$ and $h^{16}$, Figs. 1 and 5, the space of one tooth, and the vertical arm of the bell-crank lever $h^{18}$ is forced forward by the ratchet-tooth, and the horizontal arm swings upward, causing the printing-hammer $h^{22}$ to strike the paper with a rapid blow, forcing the paper against the type-wheel in position to receive the impression. After the blow the vertical arm $h^{18}$ immediately drops into the next notch of the ratchet-wheel $h^{16}$, thus permitting the paper-spring $d^{24}$ to throw the paper clear of the type-wheels and thereby prevent blurring of the impressions. When the circuit through the electro-magnet H is interrupted, the lever $h'$ is forcibly retracted by the spring $h^8$, and, by means of its pawl $h^3$ and the rack $j^4$, moves the paper-carriage and paper laterally the space between two letters, while the counter-pawl $h^5$, engaging in the counter-rack $j^5$, checks suddenly and limits the movement of the paper-carriage, and the dog $h^7$ engages in a tooth of the rack $j^4$ to prevent its retrograde movement.

The releasing electro-magnet I, depending from the table $A^3$, is provided with an armature, $i$, attached to the lever $i'$, secured to a shaft, $i^2$, on the upper extremity of which is carried the T-lever $i^4$, Figs. 1, 3, 5, 10, and 11. In the cross-arm $i^5$ of the T-lever are fixed two pins, $i^6$. The lever-arms $i^4$ and $i^5$ are situated just below the pawl $h^3$ and dog $h^7$, and the pins $i^6$ rise up just behind this pawl and dog, (one pin $i^6$ nearly in contact with the dog,) but without interfering with their regular functions. When the electro-magnet I is energized, the armature $i$ is attracted, thereby causing the shaft $i^2$ to revolve, thus swinging the T-levers $i^4$ and $i^5$, and causing the pins $i^6$ to swing into contact with the pawl $h^3$ and to disengage the dog $h^7$ from the rack $j^4$. The electro-magnet H, being in parallel circuit with the electro-magnet I, as hereinbefore explained, through the contacts on the disks $s^{11}$ and $s^9$ and springs $s^5$ and $s^3$ and conductors 7 and 11, the electro-magnet H simultaneously attracts its armature $h$, drawing forward the lever $h'$ and pawl $h^3$, which now strikes the pin $i^6$ and is thereby released from the rack $j^4$. The movement of the lever $h'$, connected to the counter-pawl $h^5$ by the link $h^6$, releases this counter-pawl from the counter-rack $j^5$. The paper-carriage is now free to return to the limit of its backward excursion when solicited by a weight or spring, $j^{32}$.

To indicate to the operator when the paper-carriage has reached the limit of its backward stroke, a bell-crank signal-lever, $j^{19}$ $j^{21}$, pivoted at $j^{20}$, and with contacts $j^{22}$ and $j^{23}$, is employed. (See Fig. 4.) The contacts $j^{22}$ and $j^{23}$ are in the circuit of the type-wheel line, Figs. 10 and 11, when the instruments are used automatically, but must be in the circuit of the printing-line when the instruments are operated through a central station, as will be hereinafter more fully described. Just as the paper-carriage reaches the limit of its backward stroke the swinging pawl $j^{17}$ trips the bell-crank lever $j^{19}$ $j^{21}$, breaking the circuit of the line closed by the contacts $j^{22}$ and $j^{23}$. An adjustable set-screw, $j^{16}$, and spring $j^{15}$ are attached to the base A of the instrument, and the return movement of the paper-carriage is arrested when the buffer $j^{14}$, secured to the side bar, J', impinges against the spring which strikes the set-screw $j^{16}$, the resistance of the spring $j^{15}$ neutralizing the shock of the carriage and the set-screw $j^{16}$ limiting its retrograde movement.

The single-line individualizing cut-out illustrated in perspective in Fig. 13 and partially appearing in Fig. 2 will now be described.

In the portions of the type-wheel line and printing-line circuits shown in Fig. 13, and also for the electro-magnets common to this figure and Figs. 10 and 11, the notation of Figs. 10 and 11 has been retained. The additional circuits required for the cut-out are indicated by numerals with literal exponents.

On a shaft, $p^6$, is mounted a ratchet-wheel, $p^5$, and a circuit-closer, O, consisting of a metallic hub, $o^2$, insulated from the shaft $p^6$ and in electrical connection with a metallic disk insulated from the shaft $p^6$, but in electrical connection with the hub $o^2$. The contact-spring $o$ bears on the hub $o^2$, and the contact-spring $o'$ bears on the disk $o^3$, these springs being insulated from each other and from the instrument. The shaft $p^6$ carries also a unison-disk, U, with a spiral on its face, in which the unison-latch $u'$, pivoted in the rock-shaft $u^6$, swings vertically as the disk U revolves and laterally when tripped by the bell-crank lever $u^3$ out of engagement with the spiral $u$. The spring $u^2$, set at an angle of forty-five degrees with the plane of the disk U, solicits the unison-latch $u'$ downward and laterally toward the face of the disk U, and when the disk U has made slightly more than one revolution the disk U is arrested by the unison-latch $u'$ reaching the termination of the groove formed by the spiral $u$. The unison-latch $u'$ is tripped by the bell-crank lever $u^3$, attached by a link, $u^5$, to one end of the armature-lever $g^2$ of the electro-magnets G and G'.

An additional metallic hub, $s^{15}$, and a metallic disk, $s^{14}$, are added to the director S, heretofore described, the disk and hub being in electrical connection with, but, however, insulated from, the shaft D. A contact-spring $s^{12}$ bears on the disk $s^{14}$, and a contact-spring $s^{13}$ on the hub $s^{15}$. The ratchet-wheel $p^5$ is caused to revolve step by step by pulsations in the conductors 6, $6^c$, $6^d$, $6^e$, and 17 in the circuit of a local printing-battery, L P B, Fig. $10^a$, which energizes the electro-magnet P and causes it to attract its armature $p$, attached to the lever $p'$, carrying the pawl $p^3$, which is caused by its spring $p^4$ to engage in the teeth of the ratchet-wheel $p^5$. When the circuit is interrupted, the retracting-spring $p^7$ withdraws the said armature and lever, and the pawl $p^3$ thereupon engages in another tooth in the ratchet-wheel $p^5$.

The operation of individualizing the instruments will be explained after the respective circuits have been traced and the operation of printing has been described.

In the unison device shown in Fig. 14 the unison-arm $f^5$ is loosely mounted on the shaft D. The disk $f^{14}$, with its stop-pin $f^{15}$, is secured to said shaft. A helical spring, $f^{12}$, encircling the shaft D, is secured at one end to a hub, $f^{13}$, on said shaft, and at the other end to the unison-arm $f^5$ and acts to revolve this unison-arm one revolution on said shaft when it is stopped by the pin $f^{15}$. The electro-magnet F must be in parallel circuit or in series with the rack electro-magnet H, and consequently the unison-arm will be released by the withdrawal of the unison-stop $f^4$ on the lever $f^2$ when the armature $f'$ is attracted by the electro-magnet F, and the unison-arm $f^5$ will be instantly revolved one revolution by the helical spring $f^{12}$. If the sunflower, Fig. 16, be employed as a director, the coils of the unison electro-magnet F may be placed in parallel circuit with the coils of the electro-magnet H by means of the contacts and the conductors 7 and 27 from said sunflower. Since one or more characters are printed during each revolution of the type-wheel shaft, the type-wheel shaft D cannot be arrested unless the printing is suspended for an entire revolution of said shaft.

In Fig. 15 the disk $f^{14}$ is loose on the shaft D, and is turned thereon by a spiral spring, $f^{19}$. The stop-pin $f^{17}$ on the disk $f^{14}$ impinges against the stop-pin $f^{18}$ on the disk $f^{16}$, attached to the shaft D. The loose disk $f^{14}$ and the fixed disk $f^{16}$ permit the type-wheel shaft D to make two revolutions before being arrested by the unison-stop $f^4$. The unison-stop shown in Figs. 14 and 15 may be substituted for the unison-stops, hereinbefore described, for arresting in unison the shafts D of the type-wheels, and also for the unison-spiral $u$ on the shaft $p^6$. It is shown in connection only with a type-wheel shaft, D, but may be applied by any skilled mechanic to the shaft $p^6$.

The respective mechanical and electro-magnetic devices having been described, the operation of the same when effected by pulsations in the electrical circuits and the course of the electrical circuits will now be explained.

Since the transmitters and receivers are precisely similar, and can be operated interchangeably by reversing the position of the switches W, Figs. 10 and 11, similar letters and numerals have consequently been employed to designate similar electro-magnets, devices, and conductors in Figs. 10 and 11. In Fig. 10 the conductor 19 is terminated at the point $w^3$, and the switch-bar $w$ connects the conductor 5 with the point $w^4$ and line 4 to the anvil-bars $b^3$ of springs $b^8$ included in the printing circuit, while the conductor 32 is terminated at the point $w^5$, and the switch-bar $w'$ connects the conductor 25 to the conductor 24, terminating in the anvil-bars $b^2$ of the springs $b^4$, operated by the keys $b^{14}$, and in the anvil-springs $b^7$, operated by the open-circuit keys $b^{13}$, and these springs $b^4$ and $b^7$ being included in the type-wheel line. The instrument, organized as indicated in Fig. 10, will then operate as a transmitter. In Fig. 11 the switch W is turned so as to break the connection between the conductors 4 and 5 and 24 and 25 at the points $w^4$ and $w^6$, and to connect the conductor 5 with 19 at the point $w^3$, and conductor 25 with 32 at the point $w^5$, thereby cutting out of circuit the anvil-bars $b^2$ and $b^3$ of the springs $b^4$ and $b^8$, and the instrument indicated in Fig. 11 will consequently operate as a receiver.

The type-wheel battery T B and the printing-battery P B are shown as divided, a portion of each appearing in Fig. 10 and the remaining portion in Fig. 11. The batteries may be united and placed at either terminal station or at any position in the main lines. When no key is depressed, the circuit of the battery T B is normally closed when the brush $c^9$ contacts with a segment, $c$, connected by the conductor 23 to a spring, $b^4$, and may be traced as follows: from earth, by conductor 34, to the negative electrode of the battery T B, and from the positive electrode to the post M' by the conductor 21; thence by the conductor 22 to the insulated spring $c^2$, by the spring $c^2$ to the hub $c^5$, in electrical connection with the arm $c^6$; thence by arm $c^6$ and the brush $c^9$ to a segment, $c$, of the sunflower C; and when the brush $c^9$ contacts with a segment, $c$, connected by the conductor 23 with a spring, $b^4$, in contact with the anvil-bar $b^2$, the circuit continues thereby to the anvil-bar $b^2$, and thence by conductor 24 to the point $w^6$, switch-bar $w'$, conductor 25, post $M^2$, temporary tie to the post $M^3$; thence by conductor 26 to a spring, $t$, of the corrector T, and by spring $t$ to hub $t^3$, in electrical connection with the disk $t^4$, by the spring $t'$ and conductor 29, to the coils of electro-magnet E; thence by the conductor 30 to the post $M^5$, by the temporary tie to post $M^4$, and thence to line 31, and by line 31 to post $M^4$ of receiver, Fig. 11. The circuit in Fig. 11 continues from post $M^4$ by a temporary tie to post $M^5$ by the conductor 30 to the coils of the electro-magnet E; thence by the conductor 29 to the spring $t'$, and by the disk $t^4$, hub $t^3$, spring $t$, and conductor 26 to post $M^3$, and by the temporary tie to the post $M^2$; thence by the conductor 25, switch-bar $w'$, point $w^5$, and conductor 32 to the contact $j^{23}$ of the signal-lever $j^{19}\ j^{21}$. From the upper contact, $j^{22}$, of said lever the circuit continues by conductor 33 to the conductor 21, connected to the negative electrode of the battery T B, the positive electrode of which is connected to earth by the conductor 34, completing the circuit.

The respective electro-magnets E of both transmitter and receiver are consequently energized by the battery T B attracting their armatures $e$, and, by means of the pallets $e^4$ and $e^5$, cause the star-wheels $e^6$ to revolve one-half the space between two of their teeth. This motion of the star-wheels revolves the type-wheel shafts D and the brushes $c^9$ a space equal to one division of the type-wheels, and the brushes $c^9$ fall on the next succeeding segments $c$ of the sunflowers C, connected by the conductors 23 to the spring $b^5$, Fig. 10, which, it will be observed, are in open circuit, having no anvil-bars, like bars $b^2$, connected to the conductor 24. Therefore the circuit will be interrupted through the respective electro-magnets E, and their armatures will be simultaneously withdrawn by the retracting-springs $e^{10}$, Fig. 2, causing the pallets $e^5$ to revolve the star-wheels $e^6$ another space equal to a division of the sunflowers and the type-wheels, and the brushes $c^9$ will again contact with segments connected by conductors 23 to closed-circuit springs $b^4$. Continuous revolution of the type-wheel shafts D will consequently be maintained automatically until the brushes $c^9$ reach the second of the three consecutive closed-circuit segments $c$ of the sunflowers, hereinbefore mentioned, when the intervention of the correctors T becomes necessary in order to effect breaks of circuit through the coils of the electro-magnets E, and thereby continue the regular alternation of makes and breaks of circuit and the uninterrupted rotation of the type-wheels. When the brushes $c^9$ are on the first of the three consecutive closed-circuit segments $c$ of the sunflowers C, the springs $t'$, Figs. 10 and 11, bear on metallic portions of the disks $t^4$, while the springs $t^2$ bear on metallic contacts on the disks $t^5$ in electrical connection with the disks $t^4$, and the currents by the springs $t$ consequently divide, by the springs $t'$ and $t^2$ and conductors 29 and 27, to the coils of the respective electro-magnets E and F, and the parallel circuits through the electro-magnets F are completed by the conductors 28. The electro-magnet F is a slow magnet, the cores of which become partially charged by this current, but not sufficiently to overcome the resilience of the retracting-spring $f^8$, Fig. 2.

When the brushes $c^9$ contact with the second closed-circuit segments $c$, the springs $t'$ fall on insulations on the disks $t^4$, and the circuits, through the springs $t'$ and conductors 29, are consequently interrupted for the duration of one pulsation, the entire current being shunted during this interval by a contact on the disks $t^5$, springs $t^2$, and conductors 27 and 28 through the coils of the electro-magnets F, giving the effect of a powerful current following a preliminary magnetization of the cores of the electro-magnets F, thereby attracting the armatures $f^7$ and withdrawing the stops $f^4$ on the armature-levers $f^2$ out of the path of the unison-arms $f^5$ of the respective instruments. The instruments will therefore revolve continuously while in unison, and if the unison-arm $f^5$ of the receiver, Fig. 11, does not arrive at the unison position simultaneously with the unison-arm $f^5$ of the transmitter the electro-magnet F of the receiver will be energized only by short pulsations, inadequate to attract its armature $f'$, until the brush $c^9$ of the receiver passes over the first two of the three consecutive closed-circuit contacts of the sunflower, when a pulsation of a divided current followed by a pulsation of the entire current will cause the withdrawal of the unison-stop $f^4$ of the receiver simultaneously with the withdrawal of the unison-stop $f^4$ of the transmitter, thus automatically effecting the unison of the type-wheels of both instruments without interrupting the regular rotation of the type-wheels. The resistance of the respective coils of the electro-magnets E and F must be proportioned so as to prevent too great diversion of the current from the electro-magnets E. The reduction of current through the electro-magnets E may be compensated by permanently uniting a spring, $b^8$, (in the printing-circuit of battery P B,) with the conductor 24 in the type-wheel line. The spring to be united is manifestly the one belonging to a key corresponding to the first of the three closed-circuit segments of the sunflower. When the brush $c^9$ contacts with this segment, the brush $c^8$ will contact with the segment $c'$, connected by the conductor 3 to the spring $b^8$, and the two batteries T B and the portion of the battery P B shown in Fig. 10 will unite in quantity, and the current on the line will be thereby momentarily re-enforced, to compensate for the reduction of current through the coils of the electro-magnets E, otherwise caused by shunting part of the current through the coils of the electro-magnets F at this position of the corrector T, as hereinbefore fully described. The spring $b^8$ so connected to the type-wheel line cannot be employed to close the printing-circuit to effect impressions.

It will be readily understood from the foregoing description that if the regular succession of open and closed circuits in the type-wheel line be interrupted, either by depressing a closed-circuit spring, $b^4$, thereby causing two consecutive segments, $c$, of the sunflower to be in open circuit, or by depressing an open-circuit spring, $b^5$, thereby causing two consecutive segments $c$ to be in closed circuit, the brush $c^9$ will be arrested on the segment $c$ corresponding with the key and spring depressed. In the former case the armatures of the electro-magnets E will remain withdrawn by their retractile springs, and in the latter case they will be permanently attracted by the electro-magnets, holding the type-wheel shaft and the type-wheels firmly in position in either case, by means of the pallets on the levers $e'$ engaging in the star-wheels $e^6$, until the key and spring are released, whereupon the normal succession of makes and breaks will thereby be restored and the type-wheels will consequently revolve automatically until another key is depressed.

When a key is depressed either depressing an open-circuit spring, $b^5$, or a closed-circuit spring, $b^4$, a spring, $b^8$, in the printing-circuit is at the same time depressed by the pin $b^{10}$ and the insulating-pin $b^4$, and makes contact with an anvil-bar, $b^3$, closing the circuits of the printing-batteries P B, Figs. 10 and 11, when the brush $c^8$ contacts with a segment, $c'$, connected by a conductor, 3, with the spring $b^8$. The circuit of the batteries P B may be traced from earth, Fig. 10, by the conductor 20 to the negative electrode, and from the positive electrode by the conductor I to the post M, and thence by the conductor 2 to the spring $c^3$, and to the hub $c^4$ in electrical connection with the arm $c^7$, and by the brush $c^8$ to the segment $c'$, connected by the conductor 3 to the spring $b^8$, depressed into contact with the anvil-bar $b^3$, thence by the conductor 4 and the repeating-key $b^{16}$ to the point $w^4$, and by the switch-bar $w$ and the conductor 5 to the post $M^6$, tied temporarily to the post $M^7$. From the post $M^7$ the circuit continues by the conductor 6 to the spring $s$ of the director S. If the key depressed represents a character to be printed, the circuit will continue by the hub $s^6$, short contact on disk $s^{11}$, spring $s^5$, and conductor 7 to the coils of the electro-magnet H of Fig. 10, and by the conductors 8 and 17 to the post $M^8$, and by the conductor 18 to the post $M^8$ of Fig. 11, thence back through the coils of the electro-magnet H by the lines similar to those just traced and to the director until arriving at the switch-bar $w$, thence by the point $w^3$ and conductor 19 to the post M, and by the conductor I to the negative electrode of the battery P B, Fig. 11, and from the positive electrode thereof, by the conductor 20, to earth, completing the circuit through the electro-magnets H of the transmitter and receiver.

These electro-magnets will thereby be simultaneously energized, attracting their armatures $h$ and drawing back their levers $h'$ and pawls $h^3$, so as to engage in the teeth of the racks $j^4$, and to disengage the counter-pawls $h^5$ from the counter-racks $j^5$.

The levers $h'$, Figs. 1, 3, and 5, are connected by the bars $h^{14}$, terminating in hook-pawls which engage a tooth in each of the ratchet-wheels $h^{15}$, secured on the same shafts with the ratchet-wheels $h^{16}$, and the attraction of the armatures $h$ therefore revolves the ratchet-wheels $h^{15}$ one tooth, causing the printing-hammers $h^{22}$ to strike the paper and effect the impression simultaneously at the transmitter and receiver and then fall clear of the paper, as hereinbefore set forth. When the key is released, the printing-circuit is interrupted between the spring $b^8$ and an anvil-bar, $b^3$, and the levers $h'$ are withdrawn by their retracting-springs $h^8$, moving the paper-carriages forward the space of one tooth in the racks $j^4$, and checking the movement by the counter-pawls $h^5$ engaging a tooth in the counter-racks $j^5$, and the paper is then in position to receive the impression of the next character. The hook-pawls on the bars $h^{14}$ also engage in the next succeeding tooth in the ratchet-wheels $h^{15}$. Since the disks $s^7$, $s^8$, $s^9$, and $s^{10}$ have each a single metallic contact corresponding, respectively, to the keys marked "Letters," "Figures," "Feed," and "Release" on the key-board B and to blank division of the type-wheels, and these contacts on any of these disks fall opposite insulations on the others and also on the disks $s^{11}$, (excepting that the disk $s^{11}$ has a contact corresponding with the contact on the releasing-disk $s^9$,) it therefore follows that when the key marked "Letters" is depressed the type-wheel shafts will be arrested, bringing the contacts on the disks $s^7$ in contact with the springs $s'$, and the printing-circuit will thereby be closed, through the springs $s'$ and the conductors 15, to the coils of the electro-magnets G, and thence by the conductors 16 and 17 to the posts $M^8$, completing the circuit as previously traced. The electro-magnets G are thereby energized, attracting their armatures $g$, to shift the letter-wheel in position to give impressions, as heretofore set forth. Similarly, when the key marked "Figures" is depressed the circuit is closed through the disks $s^8$, springs $s^2$, conductors 13, coils of the electro-magnets $G'$, and conductors 14 and 17 to the posts $M^8$ in Figs. 10 and 11, and the figure-wheel will be shifted into position to give impressions.

To feed the paper the space between two lines, the key marked "Feed" is depressed, and the type-wheels and directors are arrested with the contacts on the disks $s^{10}$ in contact with the springs $s^4$, and the circuits are closed, through the springs $s^4$ and conductors 9, to the coils of the electro-magnets N, and thence by the conductors 10 and 17 to the posts $M^8$. The electro-magnets N are energized, attracting their armatures $n'$, whereby, as previously shown, the feed-rollers $j^8$ are revolved, feeding the paper upward and forward to space between lines at any point in the excursion of the paper-carriage.

To release the paper-carriage at any point in its excursion, the key marked "Release" is pressed, causing the type-wheels and directors to be arrested with the contacts on the disks $s^9$ in contact with the springs $s^3$, and the circuit is then closed through the springs $s^3$ and conductors 11 to the coils of the electro-magnets I, Figs. 10 and 11, and thence by the conductors 12 and 17 to the posts $M^8$. The electro-magnets I are consequently energized and the dogs $h^7$ are released from the racks $j^4$, while, the circuit being simultaneously closed in parallel circuit through the disks $s^{11}$, springs $s^5$, conductors 7, and the coils of the electro-magnets H, the armatures $h$ and levers $h'$ are drawn forward, releasing the pawls $h^3$ and counter-pawls $h^5$ from their respective racks, as hereinbefore described, permitting the paper-carriages to return simultaneously to their initial positions from any point in their forward excursions.

Blanks between words are produced when the key marked "Blank" is depressed, which causes the type-wheels to be arrested with a blank on the same opposite the printing-hammers and a contact on the disks $s^{11}$ in contact with the springs $s^5$, which closes the line as hereinbefore traced through the electro-magnets H, whereby the printing-hammers are actuated without causing an impression, and when the key is released and the printing-circuit is thereby broken between the spring $b^8$ and the anvil-bar $b^3$ the paper-carriages are moved forward by the retracting-springs $h^8$, Fig. 1, a distance equal to the space between two letters.

A letter, numeral, or other character on the type-wheels may be repeated, or the operation of feeding, releasing, and shifting the type-wheels may be repeated indefinitely, by holding down the key corresponding to the desired operation, so as to maintain the directors and type-wheels in the position indicated by the depressed key, and at the same time causing repeated pulsations in the printing-line by opening and closing the key $b^{16}$ in line 4 of Figs. 10 and 11. When the key marked "Release"—an open-circuit key—is depressed, the type-wheel line is closed and the scape-wheels $e^6$ are held firmly by the action of the electro-magnets E, their armatures $e$, and the pallets $e^4$. Since the type-wheel line in Fig. 11 is connected by conductors 32 and 33 to the contacts $j^{22}$ and $j^{23}$, it follows that when these contacts are separated by the contact of the hanging pawl $j^{17}$ with bell-crank lever $j^{19}$ $j^{21}$ as the paper-carriage reaches the limit of its backward movement the regular succession of open and closed circuit segments of the sunflower will thereby be restored. The circuit being broken through the coils of the electro-magnets E, the pallets $e^5$ will revolve the type-wheel shafts so as to move the brushes $c^9$ to closed-circuit segments, and the type-wheels will therefore automatically revolve until the brushes $c^9$ encounter the two successive closed-circuit segments caused by depressing the releasing-key. This abnormal revolution of the type-wheels will indicate to the operator that the paper-carriage of a receiver has reached the limit of its backward excursion.

In Figs. 10 and 11 relays L are illustrated with their coils connected by the conductors 35 and 36, (shown by broken lines,) respectively, to the posts $M^2$ and $M^4$ in the type-wheel line. If the ties between the posts $M^2$ and $M^3$ be removed and the levers $l'$ of the relays L be connected to line at the posts $M^2$ by the conductors 37, and the back-stops $l^4$ to the posts $M^3$ by the conductors 38, a branch circuit of the type-wheel line will be closed through the coils of the electro-magnets E and at the unison position through the coils of the electro-magnets F each time the relay-lever $l'$ is vibrated in response to pulsations in the type-wheel line. The relay electro-magnets may be of high resistance compared to the resistance of the electro-magnets E and F, thus permitting the greater portion of the current to flow through these latter electro-magnets. The speed of the instruments can be regulated, as ascertained, by varying the distance of the relay-cores from the armatures $l$, or by adjusting the retractile spring $l^5$.

When it is desired to omit the printing-line and employ local batteries to energize the electro-magnets G, G', H, I, and N, the temporary ties connecting the posts $M^6$ and $M^7$ are removed, as shown in Fig. 10$^a$, and also the conductor 18 between the transmitter and receiver is removed from the posts $M^8$. The conductors between posts $M^7$ and $M^8$ are left as shown in Figs. 10 and 11, and the electrodes of the respective local batteries, as shown in Fig. 10$^a$, may be connected in a well-understood manner to posts $M^7$ and $M^8$ of the transmitter and receiver. When the short contacts of the directors S pass under the springs bearing thereon, momentary pulsations will pass in succession through the coils of the respective electro-magnets; but these pulsations will be of too short duration to overcome the resistance of the springs attached to the armatures of the electro-magnets G, G', H, I, and N. When the directors are arrested, however, with the springs bearing on any contacts and the disks of the directors, the coils of the electro-magnets connected in the local circuit closed by such contacts and contact-springs will be strongly energized, effecting the specific operation for which the electro-magnets are designed, as hereinbefore fully set forth, when the electro-magnets were included in the circuit of the main-line printing-batteries. By the omission of the printing-line and the substitution of local batteries in the manner set forth the instruments may be employed on single telegraph-lines. The repetition of letters and the other operations hereinbefore mentioned effected by the key $b^{16}$ must be effected, when the local batteries are employed, by stopping the type-wheels repeatedly at the point in their revolution corresponding to the key depressed.

The instruments may obviously be operated on a single telegraph-line connecting subscribers' instruments, provided local printing-batteries, as shown in Fig. 10$^a$, be employed at subscriber-stations, or they may be used on single lines radiating from a central station, if local printing-batteries be used for each instrument. When the lines radiate from a central station, any suitable signaling device may be provided to indicate to the central-station attendant the particular subscribers desiring the connection of the lines leading to their instruments. I prefer, however, to operate through a central station by two line-wires. The tie-bars $w^2$, Figs. 10 and 11, connecting $w$ and $w'$, are in this case removed, and the divided batteries T B and P B are located at the central station. The type-wheel lines are permanently placed to earth at all stations through the switch-bars $w'$, points $w^5$, and the conductors 32, 33, 21, and 34. The conductors 32 and 33 are connected around the contacts $j^{22}$ and $j^{23}$, and these contacts are included in the conductors 19 of the printing-line. The switch-bars $w$ of all the instruments must be turned to and retained on the points $w^3$ of all the instruments when used in receiving, and when an operator has transmitted his message the bar $w$ of a transmitter must be removed from the point $w^4$ to $w^3$, and the printing-batteries will thereby be placed to earth through the conductors 19 and 20.

The switch-bars $w$ and $w'$ being respectively on points $w^3$ and $w^5$, grounding the batteries at terminal stations, the conductors 31 and 18 (indicating, respectively, the type-wheel and the printing-lines between two instruments, Figs. 10 and 11) are connected permanently to separate metallic plates, $x^6$ and $x^8$, $z^6$ and $z^8$, in Fig. 12, and these plates may be connected by suitable plugs connecting the plates and lines to the conductors leading to the type-wheel and printing-batteries, now located at a central station, line 31 being connected to one half of the divided batteries T B by the plate $x^6$, plug $x^7$, and the conductor 52, and to the other half by the conductor 56 and plug $z^7$, when it is inserted in the plate $z^6$, and the line 18 being connected to one half of the divided batteries P B by the plate $x^8$, plug $x^9$, and conductor 43, and to the other half by the conductor 60 and plug $z^9$, when it is inserted in the plate $z^8$. The plugs are normally removed from the plates $x^6$, $x^8$, $z^6$, and $z^8$, and are permanently inserted as follows, viz: $x^7$ in the plate $x^{13}$, $x^9$ in the plate $x^{14}$, $z^9$ in the plate $z^{14}$, and $z^7$ in the plate $z^{13}$, and they remain therein until a call is received at the central station. The lines 18 are connected, through the plates $x^8$ and $z^8$, springs $x^{10}$ and $z^{10}$, and the conductors 40, with one end of the coils of the electro-magnets X and Z, the other ends of the coils being connected in parallel circuit with the conductor 41 from the local battery L B. This battery is connected to earth by the conductor 42, the lines 18 being to earth in Figs. 10 and 11. Both electro-magnets X and Z will therefore be permanently charged at all times when the printing-lines 18 are to earth and the plates $x^8$ and $z^8$ are unplugged, and their armatures $x$ and $z$ will therefore be attracted, retaining in an upright position the drop-shutters $x^3$ and $z^3$, thereby concealing the indication-number of the annunciator.

If the switch-bar $w$ in the instrument, Fig. 10, be moved from the point $w^3$ to the point $w^4$ to change this instrument to a transmitter, say, for station 1, the line 18 will be temporarily broken when the bar $w$ is passing from point $w^3$ to $w^4$, and the retracting-spring $x^5$ will withdraw the hook $x^2$ from the catch $x^4$ on the shutter $x^3$, allowing the shutter to drop, revealing the numeral indicating to the attendant at the central station the number of the instrument of the subscriber making the call. The attendant now inserts plug $x^9$, tipped with insulating material, into the plate $x^8$, and thereby breaks the connection of the line 18 with the coil of the electro-magnet X at the point $x^{11}$ and the spring $x^{10}$. At the same time line 18 is connected by the plate $x^8$, plug $x^9$, and the conductor 43 with one electrode of the left-hand section of the divided battery P B. The other electrode of this battery is connected by the conductors 44, 47, and 48 to the coils of a detent electro-magnet, V, and by the conductors 49 and 46 to the spring $z^{17}$, and thence by spring $z^{18}$ and the conductor 50 to earth.

The shaft $q^4$ is driven at adjustable speed by any suitable motor, as an electromotor, Q, frictionally connected to said shaft. This shaft carries a ratchet-wheel, $v^3$, with as many teeth, and a pulsator, V', with as many contacts, as there are divisions on the type-wheel of the instruments, as shown in Figs. 10 and 11. It also carries a type-wheel by which may be printed communications to the attendant at the central station and the number of the subscriber's calls. The type-wheel line 31 is connected to one electrode of the battery T B on the left of Fig. 12 by the plate $x^6$, plug $x^7$, and the conductor 52. The other electrode is connected by the conductor 53 to the spring $v^9$ of the pulsator V'. The conductor 58 being separated from the ground-line 59 at the springs $x^{15}$ and $x^{16}$, the circuit-connections will be through the spring $v^9$, a contact on the disk $v^7$ of the pulsator V', hub $v^8$, spring $v^{10}$, conductor 54, springs $z^{15}$ and $z^{16}$, and conductor 55 to earth. The motor being driven by the battery M B, to the electrodes of which its terminals are connected by the conductors 63 and 65, motion will be imparted to the shaft $q^4$ through the worm $q^2$ and worm-wheel $q^3$, frictionally secured to the shaft $q^4$ by the friction-clutch $q^{19}$. Pulsations will therefore pass by line 31 through the coils of the electro-magnet E, Fig. 10; and since the insulation between two of the contacts on the disk $v^7$ of the pulsator V' is removed and a metallic connection substituted to make the pulsator-contacts correspond with the segments $c$ of the sunflower C, a pulsation of the duration of three of the normal impulses will pass to line once in each revolution of the pulsator, and during the interval corresponding to the duration of two normal pulsations the unison electro-magnet F will be energized through the electrical devices and conductors, as hereinbefore described. The type-wheels in the instrument in Fig. 10 will therefore revolve in unison with the type-wheel on shaft $q^4$ at the central station by pulsations from one-half of the divided battery T B.

When any key is depressed by the operator at the instrument numbered 1 to indicate the number of the subscriber's instrument he wishes to call, (say No. 2,) the circuit will be closed between a spring, $b^3$, and an anvil, $b^3$, Fig. 10, and the detent electro-magnet V, Fig. 12, will thereby be energized, attracting its armature $v$, causing the pawl-lever $v'$ to engage a tooth on the ratchet-wheel $v^3$ and arrest the type-wheel $Q^3$, with a character thereon corresponding to the key depressed, and in position to give the impression on a paper tape, $y^{10}$.

The impressions are simultaneously effected on the transmitting-instrument and at the central station as follows: The lever $v'$ has an arm, $v^4$, projecting at a right angle therefrom, which impinges against an insulated point, $v^5$. This arm $v^4$ is insulated from the lever $v'$, and is connected by the conductor 46 to the conductor 49 in the line previously traced through the coils of the electro-magnet V, and the conductors 49 and 46, the springs $z^{17}$ and $z^{18}$, and the conductor 50. The point $v^5$ is connected by the conductor 45 through the coils of the electro-magnet Y, and thence by the conductor 44 to the negative electrode of the left-hand portion of the battery P B. When the electro-magnet V is energized to arrest the ratchet-wheel $v^3$, this branch circuit through the electro-magnet Y is consequently closed between the point $v^5$ and the arm $v^4$, energizing the electro-magnet Y, which attracts its armature $y$, causing the printing-pallets $y^4$ to impress the paper tape $y^{10}$ against the type-wheel $Q^3$, thereby printing a character corresponding to the key depressed. If the plug $z^7$ be now inserted in the bar $z^6$, the type-wheel line 31, connecting instrument No. 2, Fig. 11, with instrument No. 1, Fig. 10, the type-wheel line 31 will be completed through both sections of the battery T B, Fig. 12, and similarly, if the plug $z^9$ be inserted in the bar $z^8$, the printing-line 18 will be completed through the entire battery P B, both lines passing through the respective coils of the electro-magnets of the central-station instrument, as hereinbefore traced.

The instrument No. 2 is now under the control of the operator at instrument No. 1 and the message can be transmitted without the intervention of an operator at instrument 2.

The operation of calling instrument No. 1 from instrument No. 2 is the same as illustrated for calling No. 2 from instrument No. 1, and need not be described. When neither instrument is in use, the plugs $x^7$ and $x^9$ are placed, respectively, in the bars $x^{13}$ and $x^{14}$, and the plugs $z^9$ and $z^7$ in the bars $z^{14}$ and $z^{13}$, grounding the divided batteries T B and P B and permitting the line 18 to be closed into the coils of either electro-magnet X or Z, through the contacts $x^{11}$ or $z^{11}$, when either switch in Fig. 10 or 11 is turned to the ground-point $w^4$.

I do not confine myself to the precise operation of these instruments, as described, through a central station, since numerous modifications will readily occur to a skilled electrician. An audible signal or bell, as shown in Fig. 12$^a$, can be substituted for the visible indication, as shown in Fig. 12. The shaft $q^4$ may be continuously rotated at a regulated speed by a belt, $q^{25}$, and pulley $q^{26}$, driven by suitable power, and the ratchet-wheel $v^3$, pulsator V', and type-wheel $Q^3$ must in that case be secured to the sleeve $q^{27}$ on the shaft $q^4$, frictionally secured to and moving with said shaft until arrested by the action of the detent electro-magnet V, its armature $v$, and detent-lever $v'$, as shown in Fig. 12$^a$. A number of such combinations of ratchet-wheels, pulsators, and type-wheels secured to their respective sleeves, frictionally carried on the shaft $q^4$, and provided with electro-magnets for each separate combination to operate detents and printing-pallets, as shown in Fig. 12$^a$, may be employed. The conductors to the coils of the respective electro-magnets for each combination may in such case be connected by suitable plugs to any of a number of independent sources of electrical energy, as shown in Figs. 12 and 12$^a$, and to any number of subscriber-instruments, and several of the operative combinations, carried by their respective sleeves, may be independently controlled at the same time by the respective transmitters in the type-wheel line, in which a pulsator of the central station is included, and the printing-line of which embraces the coils of the detent and impression electro-magnets in combination with said pulsator, and two of such combinations have been shown in Fig. 12$^a$. This enables several separate subscribers to send communications at the same time, each to a different receiving-instrument. Each pulsator at the central station controls the type-wheels of the particular transmitter and receiver connected through such pulsator, and each transmitting-instrument controls the combination consisting of the ratchet-wheel $v^3$ of such pulsator V' and type-wheel $Q^3$ by means of its printing-line connected during operation through the coils of the electro-magnets V and Y.

The type-wheel $Q^3$ may be omitted from the combination, or the coils of the electro-magnet V may be excluded from the circuit to prevent a record of the messages at the central station. The essential feature of this portion of my invention consists in so organizing the instruments that without any material change and only by the proper manipulation of their switches they may be used in direct communication through a series of separate combinations of detents, pulsators, and type-wheels, such as hereinbefore described, and shown in Fig. 10ª, frictionally driven at a central station when the coils of the detent electro-magnet of such combination are embraced in a main printing-line between a transmitter and a receiver, and the detent is controlled by the key-board and operator of the transmitter connected in said line, and when such detent electro-magnet controls the pulsator embraced in the circuit of such transmitter and receiver, and each pulsator controlling the escapement electro-magnets of the transmitter and receiver connected in circuit, and thereby regulating the movement of their respective scape-wheels and type-wheels.

When the instruments are coupled in series in a single telegraph-line through the coils of electro-magnets E and F and local batteries are employed, as shown in Fig. 10ª, to energize the electro-magnets G, G', H, I, and N, it is necessary to employ an individualizing cut-out to operate by a single-line conductor when it is desired to cut out of circuit all the instruments excepting the transmitter and the receiver for which the message is intended. This operation of cutting out the instruments will now be described.

The operation of the electro-magnetic and mechanical devices shown in Fig. 13, and appearing in elevation in Fig. 2, have already been described. The conductors 6, 7, 9, 11, 13, and 15 are the same as shown in Figs. 10 and 11, and connect the springs bearing on the director S to the coils of the respective electro-magnets I, H, N, G', and G. In Fig. 13 an additional metallic hub, $s^{15}$, and a metallic disk, $s^{14}$, insulated from the shaft D and the director, must be added to the director S, previously described, and a cut-out key must be added, as shown, to the key-board. In instruments designed for operation in series such provisions must be made in designing the number of divisions in the type-wheels, sunflowers, and star-wheels. When the type-wheels are arrested by the depression of a cut-out key, a contact on the disk $s^{14}$ falls under a spring, $s^{12}$. The main printing-line and batteries, the line 5, and the temporary tie between the posts $M^6$ and $M^7$ having been removed, as shown in Fig. 10ª, and the electrodes of a local battery having been connected to posts $M^7$ and $M^8$ of each instrument in series, the circuit of said battery is closed through the conductors 6 and $6^e$, spring $s^{13}$, hub $s^{15}$, contact on the disk $s^{14}$, spring $s^{12}$, conductor $6^d$, to the coils of the electro-magnet P, thence by conductors $6^e$ and 17 to the post $M^8$, completing the circuit. The electro-magnet P is thereby energized, attracting its armature $p$, and through the lever $p'$ and pawl $p^3$ causing the ratchet-wheel $p^5$ on the shaft $p^6$ to revolve the circuit-closing disk O one division. A repetition of the revolutions of the type-wheels when arrested in each revolution at the cut-out space of the type-wheels will cause a repetition of the step-by-step movements of the circuit-closers O until all the circuit-closers of the instruments connected in series will be arrested at unison by the latch $u'$ when it reaches the termination of the unison-spiral $u$. In this position of the circuit-closers O the springs $o'$ of all the instruments will rest on insulations on the disks of said circuit-closers, and the circuit by the conductors $6^a$ and $6^b$ to the directors will be interrupted between the springs $o$ and $o'$. The latch $u'$ must then be released by depressing the key marked "Letters," when the electro-magnet G will be energized and the armature $g$ attracted, causing the lever $g^2$ to depress the link $u^5$ and release the unison-latch $u'$ by the action of the bell-crank lever $u^3$. This operation may evidently be performed by suitable attachments to any other electro-magnet if its coils be embraced in the printing-circuit through a contact on the director. The retracting-spring $u^2$ will bring the unison-latch $u'$ again into the spiral $u$ near its original position, and the circuit-closer O will again be free to revolve. The contact $o^3$ must be placed on each instrument a space equal to a division of the ratchet-wheel $p^5$ in advance of its position on a preceding instrument, the divisions being numbered from a terminal station. The depression of the cut-out key will then advance all of the circuit-closers O one division, bringing the contact $o^3$ on the instrument numbered 1 under the spring $o'$, which closes the break of the circuit between the springs $o$ and $o'$ and restores the circuit through the director, rendering operative the functions of the electro-magnets G, G', H, I, and N in instrument numbered 1.

If instrument No. 1 is to be the transmitting-instrument, the switch O' in instrument No. 1 may now be turned to the point $o^4$, breaking the conductor 6, and the circuit-closer O of this instrument will then remain stationary, while the circuit-closers of the remaining instruments are revolved by successive depressions of the cut-out key until the contact $o^3$ falls under the spring $o'$ in the instrument to which it is desired to record the message, and the springs $o'$ of all the other instruments connected in series fall on insulations on their circuit-closers O, except the spring $o$ of the transmitter. The switch O' on the transmitting-instrument is then replaced, closing the conductor 6, and the circuits through the directors S will then be operative only through these two instruments to record the message.

The type-wheels of all instruments will revolve, because the type-wheel line has not been interrupted; but the electro-magnets P of such instruments will not be energized until the cut-out key is depressed for the purpose of connecting other instruments in series. It is evident that by the arrangement of the contacts $o^3$ in identical positions on the circuit-closers O of several instruments the directors of such instruments may be brought into circuit at the same time and messages be simultaneously recorded on all the instruments so organized.

Having thus described the nature and objects of my invention, what I claim as new, and desire to secure by Letters Patent, is—

1. In a printing-telegraph system, the combination of a battery, a main-line circuit for setting the type-wheels, a sunflower, transmitting-keys with their contact-springs, means for connecting said battery with the sunflower-segments and the segments with said line, a neutral escapement electro-magnet included in said line responding to alternate makes and breaks of circuit therein, wedge-pallets actuated by said electro-magnet, a star-wheel driven by said wedge-pallets, a type-wheel shaft rotated thereby, and a brush carried by said shaft, but insulated therefrom, making contact with the segments of said sunflower alternately in open and closed circuit with said key-contacts and said line, thereby automatically producing the pulsations which actuate said mechanical and electrical devices to propel and arrest said shaft when the alternate succession of makes and breaks of circuit is interrupted by the depression of a key.

2. In a printing-telegraph system, the combination of a sunflower device, a main-line battery-circuit for setting the type-wheels, transmitting-keys with their contacts, electrical devices for connecting said battery with said line and sunflower-segments, a neutral escapement electro-magnet included in said line and responding to alternate makes and breaks of circuit, wedge-pallets actuated by said electro-magnet and driving a star-wheel secured to a type-wheel shaft, and a brush on said type-wheel shaft contacting with alternate open and closed circuit segments of said sunflower, causing pulsations which actuate said devices to rotate said shaft, substantially as and for the purposes set forth.

3. In a printing-telegraph system, the combination of a double sunflower device, two main lines and batteries for controlling, respectively, the type-wheels and the printing mechanism, transmitting-keys and their contact-springs, electrical devices for connecting the batteries with the lines and the sunflower-segments, a neutral escapement electro-magnet included in one of said lines responding to alternate makes and breaks of circuit, wedge-pallets actuated by said electro-magnet, a type-wheel shaft, a star-wheel, and a brush mounted on said shaft, said brush contacting with alternately open and closed circuit segments of one sunflower connected with said type-wheel line, producing pulsations which cause said shaft to be arrested when the alternate succession of impulses is interrupted by the depression of a key, which at the same time actuates said electrical devices connecting the line controlling the printing mechanism with a segment of said sunflower in the printing-line, whereby when the type-wheel shaft is arrested a brush thereon contacts with said segment and an impulse is sent to line.

4. In a printing-telegraph system, the combination of a double sunflower device, two main lines and batteries for controlling, respectively, the type-wheels and the printing mechanism, transmitting-keys with their contact-springs, electrical devices for connecting the said batteries with the lines and sunflower-segments of the type-wheel line, a relay electro-magnet with its coils included in said line, a neutral escapement electro-magnet included in a branch of said line and responding to alternate makes and breaks of circuit, wedge-pallets, a type-wheel shaft, and a star-wheel and two brushes mounted thereon, said escapement electro-magnet actuating said pallets when the pulsations automatically produced by one of said brushes contacting with alternately open and closed circuit segments of the sunflower connected with the type-wheel line are closed in parallel circuit through the neutral escapement electro-magnet, thereby driving the type-wheel shaft and producing prolonged makes or breaks of circuit, which arrest said shaft when the alternate succession of impulses is interrupted by the depression of a transmitting-key, which at the same time actuates said electrical devices connecting the line controlling the printing mechanism with a segment of said sunflower in the printing-line, whereby when the type-wheel shaft is arrested the other brush thereon contacts with said segment and an impulse is sent through said printing-line.

5. In a printing-telegraph system, the combination of a main-line battery and circuit for setting the type-wheels, a sunflower device, keys with their spring-contacts, electrical devices for connecting said battery with said line and sunflower-segments, a relay electro-magnet with its coils included in said line, a neutral escapement electro-magnet responding to alternate makes and breaks of circuit and included in a branch of said main line, and wedge-pallets actuated by said electro-magnet and driving a star-wheel, said star-wheel mounted on the same shaft with a brush which contacts with alternate open and closed circuit segments of said sunflower, causing pulsations which actuate said relay electro-magnet, thereby closing said type-wheel line in parallel circuit through said escapement electro-magnet, substantially as and for the purposes set forth.

6. In a printing-telegraph system, the combination, with a main-line battery and circuit for setting the type-wheels, a sunflower, transmitting-keys with their contact-springs, means for connecting said battery with the sunflower-segments and the segments with said main-line circuit, and a relay electro-magnet with its coils included in said line, of a neutral escapement electro-magnet included in a branch of said line responding to alternate makes and breaks of circuit therein, wedge-pallets actuated by said escapement electro-magnet, a star-wheel driven by said wedge-pallets, and a type-wheel shaft rotated thereby, and a brush carried on the same shaft, but insulated therefrom, making contact with the segments of said sunflower alternately in open and closed circuit with said key-contacts and said line, thereby automatically producing the pulsations which actuate said relay electro-magnet to close said line in parallel circuit through said escapement electro-magnet, causing the rotation of said shaft and arresting of the same when the alternate succession of makes and breaks of circuit is interrupted by the depression of a key.

7. In a printing-telegraph system, the combination, with a battery and a type-wheel main line, of devices for producing electrical pulsations in said main line, an escapement electro-magnet in a branch of said line, and an electro-magnet in said main line, its armature, lever, and contact-point, whereby said branch line is closed in parallel circuit through said escapement electro-magnet, substantially as and for the purposes set forth.

8. In a printing-telegraph system, the combination of a sunflower device, a main-line battery-circuit, a branch circuit thereof, an escapement electro-magnet included in said branch circuit for setting the type-wheels, transmitting-keys with their contacts, electrical devices for connecting said battery with said main line and the segments of said sunflower, a neutral electro-magnet in said main line alternately closing and opening said main line in parallel circuit through the coils of said escapement electro-magnet, wedge-pallets, a type-wheel shaft, a star-wheel thereon, and a brush secured to the same shaft contacting with alternately open and closed circuit segments producing pulsations which cause said shaft to be arrested when the succession of alternate impulses is interrupted by the depression of a key.

9. In a printing-telegraph system, the combination of a sunflower device, a battery, a main-line circuit, transmitting-keys with their contact-springs, electrical devices, substantially such as described, for connecting the said battery with said main-line and sunflower segments, a neutral escapement electro-magnet in said line responding to alternate makes and breaks of circuit, wedge-pallets controlled by said electro-magnet, a type-wheel shaft, a scape-wheel, and a brush suitably mounted thereon and operating to rotate said shaft by pulsations automatically produced by said brush contacting with the alternate open and closed circuit segments of said sunflower, and by which said shaft is arrested when the alternate succession of impulses is interrupted by the depression of a transmitting-key, substantially as and for the purposes set forth.

10. In a printing-telegraph system, the combination of a double sunflower device, two main lines and batteries for controlling the type-wheels and printing mechanism, transmitting-keys with their contact-springs, electrical devices for connecting said batteries with said lines and sunflower-segments, a relay electro-magnet in said type-wheel main line, its armature, lever, and contact-point, a branch circuit of said type-wheel line, and an escapement electro-magnet included therein, wedge-pallets, a type-wheel shaft and a scape-wheel mounted thereon, a brush mounted upon the same shaft, said brush contacting with open and closed circuit segments of one of said sunflowers connected with said type-wheel line, producing pulsations which cause said relay to close the branch circuit through said escapement, and electro-magnet to arrest said shaft when the alternate succession of impulses is interrupted by the depression of a key, which at the same time actuates said electrical devices connecting the said line controlling the printing mechanism with a segment of said sunflower in the printing-circuit, whereby when the type-wheel shaft is arrested a brush thereon contacts with said segment and an impulse is sent through said printing-line.

11. In a printing-telegraph system, a battery, a main-line circuit, electrical devices, substantially as described, a neutral escapement electro-magnet automatically operated by direct currents, a wedge-pallet escapement controlled by said electro-magnet, a type-wheel shaft, a star-wheel mounted thereon, and means, substantially as described, for arresting said shaft, in combination with a circuit-director and type-wheels mounted on said type-wheel shaft, a local-battery circuit through said director, an electro-magnet with its coils in said circuit and responding to prolonged pulsations, its armature, lever, and retracting-spring, a ratchet-lever, pawl, ratchet-wheels, printing-lever, and hammer, said electro-magnet when energized operating to revolve said ratchet one notch, thereby actuating the printing-hammer, and when demagnetized to move the paper-carriage by the action of its lever, pawl, and retracting-spring to space between letters, substantially as described.

12. In a printing-telegraph system, a battery, a main-line circuit, electrical devices, substantially as described, a neutral escapement electro-magnet automatically operated by direct currents, a wedge-pallet escapement controlled by said electro-magnet, a type-wheel shaft, a star-wheel thereon, and means, substantially as described, for arresting said shaft, in combination with a circuit-director and type-wheels mounted on said shaft, a local-battery circuit through said director, an electro-magnet with its coils in said circuit responding to prolonged pulsations, its armature, lever, shaft, arms, feeding-rod, and retracting-spring, a paper-carriage, its feed-rollers, ratchet-wheel, and ratchet-lever, operating when the director is arrested and the said electro-magnet is energized by prolonged pulsations to revolve said ratchet-wheel one notch, and thereby feed the paper between lines at any point in the excursion of said carriage.

13. In a printing-telegraph system, the combination, with a local battery, a battery and main-line circuit, electrical devices, substantially as described, a neutral escapement electro-magnet automatically operated by direct currents, a wedge-pallet escapement controlled by said electro-magnet, a type-wheel shaft and a star-wheel mounted thereon, and means, substantially as described, for arresting said shaft, of a circuit-director and type-wheels mounted on said shaft, a local-battery circuit through said director, electro-magnets with their coils in said circuit responding to prolonged pulsations, their armature, lever, and mechanism connected therewith and operating when the director is arrested and either of said electro-magnets is energized by prolonged pulsations to shift said type-wheels, substantially as described.

14. In a printing-telegraph system, the combination, with a battery and main-line circuit, electrical devices, substantially as described, a neutral escapement electro-magnet automatically operated by direct currents, a wedge-pallet escapement controlled by said electro-magnet, a type-wheel shaft, a star-wheel mounted thereon, and means, substantially as described, for arresting said shaft, of a circuit-director and type-wheels mounted on said shaft, a local-battery circuit through said director, a ratchet electro-magnet with its coils in said circuit, its armature, lever, retracting-spring, pawl, and counter-pawl, a releasing electro-magnet, its armature, lever, retracting-spring, releasing-arms, and pins, said electro-magnets responding to prolonged pulsations, a paper-carriage, its rack, counter-rack, and dog operating when said director is arrested and said electro-magnets are energized by currents in parallel circuit to release said paper-carriage at any point in its excursion.

15. In a printing-telegraph system, the combination of two sunflowers, a type-wheel shaft concentric therewith carrying brushes insulated therefrom and from each other and contacting with the respective segments of said sunflowers and in the circuits of separate conductors for the type-wheel and printing lines, character-keys in electrical connection with the segments of said sunflower, the closed-circuit keys and the anvils of the open-circuit keys in electrical connection with the type-wheel line, contact-springs for said keys in electrical connection with the segments of the other sunflower, anvils connected with said printing-line, and a neutral escapement electro-magnet with its coils included in the type-wheel line, substantially as and for the purposes set forth.

16. In a printing-telegraph system, the combination, with a battery and type-wheel line, a sunflower and a type-wheel shaft concentric therewith, a brush insulated therefrom in the circuit of said type-wheel line and contacting with the sunflower-segments, open and closed character-keys with their contact-springs electrically connected with said segments, the closed-circuit keys and anvils of the open-circuit keys electrically connected with said line, a neutral escapement electro-magnet with its coils included in said line and operating to actuate a star-wheel, a type-wheel shaft, and said star-wheel mounted thereon and driven by the vibrations imparted to the armature and wedge-pallet levers of said electro-magnet by its retracting-spring and by electrical impulses acting alternately therewith when said impulses are caused by said brush contacting with alternate segments of said sunflower electrically connected with said circuit-keys.

17. In a printing-telegraph system, the combination of a type-wheel line and printing-line, a sunflower with two annular series of segments, a type-wheel shaft concentric therewith carrying two brushes insulated therefrom and from each other in the circuits of the respective lines and contacting, respectively, with the series of segments, open and closed circuit character-keys with their contact-springs electrically connected with the segments included in the type-wheel line, the closed-circuit keys and the anvils of the open circuit keys electrically connected with said line, contact-springs insulated from the former springs and electrically connected with the segments included in the printing-line, anvils for said springs connected to said line, a type-wheel shaft, a star-wheel thereon, and an escapement electro-magnet included in the type-wheel line and operating to drive said star-wheel by the vibrations imparted to the armature and pallet-levers of said electro-magnet by its retracting-spring, and the electrical impulses acting alternately therewith when said impulses are caused by the brush in the type-wheel line contacting with alternate segments of the series of segments in said line electrically connected with closed-circuit keys, and operating to arrest said type-wheel shaft when said brush contacts successively with two segments connected to or disconnected from the line by the depression of any key, and said printing-line being simultaneously closed when the brush in said line makes contact with a segment in the printing-line connected to a spring of said key.

18. In a printing-telegraph system, the combination, with batteries and type-wheel and printing-circuits, of a type-wheel shaft, a circuit-director thereon revolved by said shaft, electro-magnets in the printing-circuit of said director, the contact-springs of said director being in a branch circuit of said printing-line, an electro-magnet included in said branch circuit, its armature, lever, pawl, and ratchet-wheel, an individualizing circuit-closer, a unison-spiral, the electro-magnet in said branch circuit operating when the type-wheel is arrested at a determinate point to revolve said circuit-closer one notch and successively one notch for each revolution of the type-wheel until the circuit-closers in a series of instruments are arrested in unison, an electro-magnet with its coils in said branch circuit, its armature and lever, a lever pivoted thereto, a unison-latch released thereby when the type-wheel is arrested at a position of the director where said electro-magnet in circuit is energized thereby, circuit contacts, and insulations on the circuit-closing disks included in the printing-circuit and arranged one for each instrument in their order of succession in series, whereby when the circuit-closers are simultaneously rotated the printing-circuits through the director of each instrument are successively closed and interrupted and the branch circuit through the electro-magnet operating the circuit-closer maintained.

19. In a printing-telegraph system, an individualizing cut-out, a battery, and a main-line type-wheel circuit, a circuit-director in a branch of the printing-circuit and controlled by the type-wheel shaft, an electro-magnet, and a circuit-closer with its contact-springs included in said circuit, the circuit-closer being controlled by said electro-magnet, and means, substantially as described, to interrupt the printing-circuit of any instrument in said type-wheel circuit when the director is arrested at a determinate position, substantially as and for the purposes set forth.

20. The combination, with an individualizing cut-out for a telegraphic printer, of a battery and printing-line circuit, a circuit-director included in said circuit, a battery and type-wheel-line circuit, an electro-magnet in said circuit, a type-wheel shaft, and means for rotating and arresting said shaft, a circuit-closer and its contact-springs included in said printing-circuit, an electro-magnet energized by said printing-line, a unison-stop on the shaft of said circuit-closer released by said electro-magnet, said circuit-closer controlled by an electro-magnet in a branch of said printing-circuit, and means, substantially as described, to unison the respective circuit-closers in instruments connected in series in said type-wheel line and to close the printing-circuit through the director in instruments on which a message is to be recorded and to interrupt said printing-circuit in all the other instruments in series, substantially as and for the purposes set forth.

21. In a printing-telegraph system, the combination of a transmitter at a subscriber-station, keys and sunflower-segments in a printing-circuit of a battery and in a type-wheel-line circuit of a battery, an escapement electro-magnet included in said circuit, one electrode of both batteries grounded at said station, annunciator electro-magnets included in a battery-circuit, one electrode of which is grounded at a central station, and means, substantially as described, for connecting the printing-line to the other electrode of said annunciator-circuit, operating, when the line is broken at the transmitter, to demagnetize the annunciator electro-magnet and indicate the number of the subscriber-instrument.

22. In a printing-telegraph system, an instrument organized as a transmitter at a subscriber-station, a printing-circuit, keys and sunflower-segments in said printing-line circuit, a type-wheel-line circuit, and both circuits connected to ground at said station, printing and type-wheel batteries at a central station, with the electrodes thereof normally connected to ground at said station, a shaft frictionally driven by suitable power and regulated at said central station, a pulsator, a ratchet-wheel, and type-wheel on said shaft in said type-wheel line, an electro-magnet in said printing-line, its armature, detent-lever, and retracting-spring controlling said ratchet-wheel, a printing electro-magnet included in the printing-line operating a printing-platen, a paper-feeding device, and means, substantially as described, for connecting one electrode of said batteries to the subscriber printing and type-wheel lines through said central-station pulsator, whereby the subscriber type-wheel is rotated, the central-station instrument arrested, and the signal thereby recorded in response to the depression of the keys of said transmitter, indicating by suitable characters at the central station the subscriber to be connected through said central-station instrument.

23. In a printing-telegraph system, an instrument organized as a transmitter at a subscriber-station, a printing and a type-wheel circuit, character-keys and sunflower-segments in said printing-line circuit, an escapement electro-magnet in said type-wheel circuit, and both circuits connected to ground at said transmitter-station and a central station, printing and type-wheel batteries at said central station, with the electrodes thereof normally connected to ground, a type-wheel shaft frictionally driven by suitable power and regulated at said central station, a pulsator on the type-wheel shaft, a type-wheel and a ratchet-wheel mounted on the same shaft, an electro-magnet in said printing-line, its armature, detent-lever, and retracting-spring controlling said ratchet-wheel, a printing electro-magnet included in said printing-line operating a platen, a paper-feeding device, instruments organized as receivers at subscriber-stations, with the printing and type-wheel lines connected to ground around the sunflower-segments and key-board, means for connecting the type-wheel and printing-lines of a subscriber-receiver and the type-wheel and printing-lines of a subscriber-transmitter with the batteries at said central station through said pulsator, and printing and detent electro-magnets, whereby the type-wheels of the transmitter and receiver connected in line are rotated in response to pulsations by the said central-station pulsator, and said detent at the central station and the printing at the central and subscriber stations in circuit are controlled by the character-keys of the subscriber-instruments organized as a transmitter.

24. In a printing-telegraph system, an instrument organized, substantially as described, as a transmitter at a subscriber-station, a printing-circuit, and a type-wheel circuit, keys and sunflower-segments in said printing-circuit, an escapement electro-magnet in said type-wheel circuit and both circuits connected to ground at said transmitting and central stations, printing and type-wheel batteries at said central station, with the electrodes thereof normally connected to ground, a shaft driven by suitable power at said central station, a pulsator and a ratchet-wheel frictionally connected with said shaft, an electro-magnet in said printing-line, its armature, detent-lever, and retracting-spring controlling said ratchet-wheel and pulsator, instruments organized, substantially as described, as receivers at subscriber-stations, with the printing and type-wheel lines grounded around the sunflower-segments and key-board, and means for connecting the type-wheel and printing lines of a subscriber-receiver and the type-wheel and printing lines of a subscriber-transmitter with the batteries at said central station through said pulsator and detent electro-magnets, whereby the type-wheels of the transmitter and receiver connected in line are rotated in response to pulsations by the said central-station pulsator, and the said detent at said central station and the printing at the subscriber-station in circuit are controlled by the character-keys of the subscriber-instrument organized as a transmitter.

25. In a printing-telegraph system, an instrument organized as a transmitter at a subscriber-station, a printing-line circuit and a type-wheel-line circuit, keys and sunflower-segments in said printing-line circuit, an escapement electro-magnet in said type-wheel-line circuit and both circuits connected to ground at the transmitting and central stations, printing and type-wheel line batteries at said central station with the electrodes thereof normally connected to ground, a shaft driven by suitable force at said central station, a pulsator, a ratchet-wheel and a type-wheel frictionally connected with said shaft, an electro-magnet in said printing-line circuit, its armature, detent-lever, and retracting-spring controlling said ratchet-wheel and pulsator, instruments organized, substantially as described, as receivers at subscriber-stations, with the printing and type-wheel lines grounded around the sunflower-segments and key-board, and means for connecting the type-wheel and printing lines of a subscriber-receiver and the type-wheel and printing lines of a subscriber-transmitter with the batteries at said central station through said pulsator and printing and detent electro-magnets at the central station, whereby the type-wheels of the transmitter and receiver connected in line are rotated in response to pulsations by the said central-station pulsator, and said detent electro-magnet at the central station and said printing electro-magnets at the subscriber-station in circuit are controlled by the character-keys of the subscriber-instrument organized as a transmitter.

26. In a printing-telegraph system, the combination, with an instrument organized as a transmitter at a subscriber-station, a printing-line circuit and a type-wheel-line circuit, character-keys, and a sunflower device in said printing-line circuit, and both circuits grounded at said transmitting-station and at a central station, printing and type-wheel line batteries at said central station, with the electrodes thereof normally connected to ground, a shaft frictionally driven by suitable power at said central station, a pulsator and a ratchet-wheel connected with said shaft, an electro-magnet in said printing-line circuit, its armature, detent-lever, and retracting-spring controlling said ratchet-wheel and pulsator, of instruments organized, substantially as described, as receivers at subscriber-stations, with the printing-line and type-wheel-line circuits grounded around the sunflower-segments and key-board, and means for connecting the type-wheel and printing-line circuits of a subscriber-receiver and the type-wheel line and printing-line circuits of a subscriber-transmitter with the batteries at said central station through said pulsator and detent electro-magnets at said station, substantially as and for the purposes set forth.

27. In a printing-telegraph system, the combination, with a battery, a main-line conductor, alternate segments of a sunflower device connected in circuit therewith, a type-wheel shaft, and a contact-brush insulated therefrom, of character-keys and contacts therefor, means for rotating said shaft, a circuit-director thereon, with contacts corresponding to the divisions on the type-wheels, electro-magnets and their actuated devices, a battery and a printing-circuit, and means, substantially as described, for connecting said director and character-keys in the printing-circuit with the respective electro-magnets, whereby the operation of feeding the paper between lines, spacing between letters, releasing the paper-carriage, and shifting the type-wheel is effected, substantially as described.

28. In a printing-telegraph system, the combination of a shaft, a force for driving said shaft, a ratchet-wheel and a pulsator mounted on said shaft, an electro-magnet in a main-line battery-circuit controlling said ratchet-wheel at a central station, and character-keys, their contact-springs and contacts in said main-line circuit at a terminal station controlling the circuit through said ratchet electro-magnet, substantially as and for the purposes set forth.

29. The combination, in a printing-telegraph, of an electromotor, Q, electro-magnets Q', a worm, $q^2$, carried on the shaft of said motor, a detent and pulsator-shaft, and a worm-wheel, $q^3$, frictionally mounted thereon, substantially as and for the purposes set forth.

30. In a printing-telegraph system, the combination, with a battery and main-line printing-circuit, a printing electro-magnet, Y, at a central station in a branch of said circuit, and mechanism, substantially such as described, actuated thereby, of a shaft, $q^4$, a ratchet-wheel, $v^3$, frictionally mounted on said shaft, a detent electro-magnet in said printing-circuit, and devices actuated by said electro-magnet and operating to arrest said ratchet-wheel and close said branch printing-circuit through said printing electro-magnet, substantially as described.

31. In a printing-telegraph system, the combination, with a shaft, a pulsator mounted thereon, springs in contact with the disk and hub of said pulsator in the circuit of a type-wheel-line battery-circuit, and a ratchet-wheel on the same shaft, of a printing electro-magnet, its armature, lever, printing-platen, and retracting-spring, said electro-magnet being in a branch of a main-line printing-circuit, a feeding device, a detent electro-magnet in the printing-line circuit, its actuated devices, a contact-point, a type-wheel mounted on said shaft, and transmitting-keys with their springs and contacts included in the circuit of said main-line printing-circuit, substantially as and for the purposes set forth.

32. In a printing-telegraph system, the combination, with a signal electro-magnet in a local-battery circuit, its armature, lever, retracting-spring, and an annunciator-drop, metallic blocks and springs, plugs fitting into said blocks, and printing and type-wheel battery-circuits connected to said plugs, of a printing electro-magnet in a branch of said printing-circuit, its actuated devices, a shaft and a ratchet-wheel, a type-wheel, and a pulsator mounted on said shaft, and a detent electro-magnet in the type-wheel line and its actuating devices, substantially as and for the purposes set forth.

33. In a printing-telegraph system, the combination, with a circuit-directing device, S, in a local circuit, of a shaft, and a circuit-closing device mounted on said shaft, springs in said circuit bearing on the disks and hubs of said device, a unison-spiral secured to the same shaft and its latch, an electro-magnet for releasing said latch, a ratchet-wheel, an electro-magnet, P, in said local circuit, and its armature, lever, retracting-spring, and pawl, substantially as and for the purposes set forth.

34. In a printing-telegraph system, the combination, with the electro-magnets G and G', with their armature and lever, a right-angular depending bar secured to said armature, lever, and a bell-crank lever pivotally connected with said bar, of a shaft, a unison-spiral mounted upon said shaft, and a latch-bar journaled to a horizontal rock-shaft, substantially as and for the purposes set forth.

35. In a printing-telegraph, the combination of a transversely-traveling paper-carriage having side bars attached to cross-bars, said side bars carrying feed-rollers, pressure-rollers, and a paper-roller, a channeled guide-bar attached to the base-plate of the instrument, guide-rollers journaled in brackets secured to the cross-bars of said paper-carriage, a rack and counter-rack, rails secured to the instrument and grooved wheels traveling over said rails, a weight for soliciting said carriage, a buffer secured to said carriage, and a spring attached to a fixed standard for determining its retrograde movement, substantially as set forth.

36. In a printing-telegraph system, the combination, with a battery, a printing-line, and a unison electro-magnet included therein and its actuated devices, of a type-wheel shaft, and a loose unison-arm mounted on the same shaft, a coiled spring the extremities of which are attached to said loose arm and to a hub rigidly secured to said shaft, a loose disk having double stop-pins, a spiral spring attached at one end to said disk and at the opposite end to a hub on said shaft, and a fixed disk mounted on the same shaft, having a stop-pin in the face thereof, substantially as described.

37. In a printing-telegraph system, the combination, with a unison electro-magnet, its armature, lever, and a stop formed integral with said lever, of a type-wheel shaft, a unison-arm loosely mounted thereon, a helical spring coiled around said shaft and the respective extremities thereof attached to said arm and shaft, and a disk mounted on said shaft having a stop-pin, substantially as and for the purposes set forth.

38. In a printing-telegraph system, the combination, with a battery-circuit and a ratchet electro-magnet included in said circuit, of a shaft, ratchet-wheels mounted thereon and actuated by said electro-magnet, and a printing-hammer operated by said ratchet-wheel, substantially as and for the purposes set forth.

39. In a printing-telegraph system, the combination of an ink-roller frame loosely pivoted between fixed collars, a shifting-rod on which said collars are mounted, an ink-roller journaled to said frame, an adjustable spring to regulate the pressure of said ink-roller against type-wheels, and an adjusting-screw against which a plate impinges when said ink-roller passes over blank spaces on the type-wheels, substantially as described.

40. In a printing-telegraph system, the combination, with the shifting-rod $g^{11}$ and the arm $d^{11}$, secured thereto, having two concave recesses in its upper surface, of a spring, $d^{12}$, attached to a plate and carrying pivoted to its extremity a roller which engages in one of the recesses of said arm when the type-wheels are shifted into either position, substantially as described.

41. The combination, in a printing-telegraph, of curved guards consisting of the vertical bars $d^{27}$ and horizontal flanged plates $d^{28}$, secured to a plate, $a^{12}$, the stud-pins $d^{25}$, sleeves $d^{26}$, and nuts $d^{29}$, said vertical bars arranged so as to support said horizontal flanged plates in such position as to permit the paper to lie close to but out of contact with the type-wheels, substantially as described.

42. In a printing-telegraph system, the printing-spring $d^{24}$, adjustably attached to an arm, $d^{23}$, located between the type-wheels D' and $D^2$, in combination with the shifting-rod $g^{11}$, substantially as and for the purposes set forth.

43. In a printing-telegraph system, the face-plate $a^{12}$, in combination with the curved guards $d^{27}$ and $d^{28}$, stud-pins $d^{25}$, sleeves $d^{26}$, and nuts $d^{29}$, substantially as and for the purposes set forth.

44. In a printing-telegraph system, the combination, with a type-wheel shaft, two type-wheels loosely mounted on a sleeve secured to said shaft, two shifting electro-magnets with their actuated devices, and means, substantially such as described, for holding the ink-roller and shifting it with said type-wheels, of the ink-roller, and an arm attached to said shifting mechanism, located between said type-wheels and carrying a spring, substantially as and for the purposes set forth.

45. In a printing-telegraph system, the combination, with a metallic side plate, $A^4$, of a removable metallic cap provided with a flange around the periphery thereof, a central bearing, a shaft held in position in said cap, and an annular ring having integral therewith a recessed rim forming a seat for a sunflower device, whereby said device may be readily removed from the frame-plate without disturbing the conductors leading from said sunflower device, substantially as described.

46. In a printing-telegraph system, a circuit-directing device consisting of an annular ring of insulating material, with a series of metallic contacts therein, said metallic contacts being connected by conductors with the respective electro-magnets of the instrument, in combination with the type-wheel shaft, a hub and disk secured thereto, but insulated therefrom, an arm, rigidly secured to said disk carrying a brush which traverses the segments of said circuit-directing device, a contact-spring, and an insulated block to which said spring is attached and bearing on said hub, all arranged as shown and described.

47. A printing-telegraph instrument consisting of an independent frame composed of two metallic side plates held to each other by means of horizontal posts, said plates being supported on a base, glass sides and top, two removable corner strips for holding said glass sides and top in position, a cylindrical tube supported by one of said metallic plates, a face-plate suitably secured to said tube, a bracket attached to said face-plate for supporting in position a shaft, a removable annular ring recessed to receive a sunflower device, and a removable cap attached to the other metallic plate, forming a bearing for the opposite extremity of said shaft, all arranged, substantially as described, for permitting of the removal of said independent frame from the base without disturbing the electrical and mechanical devices.

48. In a printing-telegraph system, the combination, with a battery and a printing-line circuit, of a paper-carriage, a ratchet electro-magnet included in said circuit, its armature, lever, and retracting-spring, a pawl pivoted to said lever, a stud secured to the table of said instrument, a dog mounted upon said stud, a rack secured to said carriage, a hook-pawl hinged to the lever of said electro-magnet, two ratchet-wheels secured to a shaft, one ratchet-wheel moved step by step by the hook-pawl, causing the other ratchet-wheel to actuate a bell-crank lever mounted on a trunnion, and a printing-hammer operated by said bell-crank lever, substantially as and for the purposes set forth.

49. In a printing-telegraph system, the combination, with a battery and printing-circuit, of a paper-carriage, and mechanism, substantially as described, for actuating said carriage, a releasing electro-magnet in said circuit, and its armature and lever, a shaft journaled in a sleeve secured to the instrument, a T-lever attached to said shaft, and pins in the upper portion of said lever, substantially as and for the purposes set forth.

50. In a printing-telegraph system, the combination, with a battery and a printing-circuit, of a transversely-traveling paper-carriage, a releasing electro-magnet in said printing-circuit and its actuated devices, a ratchet electro-magnet in a parallel circuit, devices actuated by said electro-magnet, a type-wheel shaft, and means, substantially as described, for rotating the same, and a circuit-director mounted on the same shaft, whereby when said circuit is closed through the coils of said electro-magnets the paper-carriage is released at any point in its excursion, substantially as shown and described.

51. In a printing-telegraph system, the combination, with a battery and a printing-circuit, of a transversely-traveling paper-carriage, a director in said circuit, a ratchet electro-magnet in the same circuit, its actuated devices, and a releasing electro-magnet in a parallel circuit therewith through said director and its actuating mechanism, whereby when said electro-magnets are energized, actuating said devices, the paper-carriage is released at any point, substantially as shown and described.

52. In a printing-telegraph system, the combination of a battery and printing-line circuit, a central station, terminal stations, a paper-carriage with its actuating devices at each terminal-station instrument, a detent electro-magnet with its actuating devices at a central station, a circuit-interrupter in a receiver at a terminal station, said electro-magnet and interrupter being in the circuit of said battery, and a detent at said central station released by said electro-magnet when the printing-circuit is interrupted by the retrograde movement of the paper-carriage of a receiver, substantially as described.

53. In a printing-telegraph system, the combination, with a battery, a type-wheel-line circuit, keys with open and closed circuit springs in the circuit of said battery, a sunflower device, a brush traversing the segments of said sunflower device, a neutral escapement electro-magnet in said type-wheel-line circuit, its armature, lever, and wedge-pallets, a shaft, and a star-wheel and type-wheels mounted on said shaft, of a circuit-interrupter, a battery, and a printing-circuit, a central station detent thereat, and an electro-magnet in said circuit, and a paper-carriage and its actuating mechanisms, ubstantially as described, operating to break the said circuit and release the detent at said central station when the paper-carriage has reached the end of its retrograde movement, substantially as set forth.

54. In a printing-telegraph system, the combination, with a battery, a type-wheel circuit, and keys with contact-springs in the circuit of said battery, of a type-wheel shaft, a sunflower, an insulated traversing brush mounted on said shaft, means for rotating said shaft, a neutral electro-magnet in said type-wheel line, its armature, lever, and wedge-pallets, a scape-wheel on said shaft controlled by said pallets, a circuit-interrupting bell-crank lever and spring secured to the instrument, a paper-carriage and means for operating said carriage, and a pawl for actuating said bell-crank lever, and thereby breaking the type-wheel-line circuit by the retrograde movement of said carriage, substantially as described.

55. The combination, in a paper-carriage, of side bars attached to cross-bars, a rack and a counter-rack, feed and pressure rollers, a paper-roller, grooved wheels for the lower track, friction-rollers playing between guides for the upper track, rails secured to the rear of the instrument for said grooved wheels to travel over, and guards secured to the instrument to limit the vertical and lateral play of the friction-rollers, a weight for soliciting said carriage, a buffer secured to said carriage, and an elastic stop secured to the instrument for determining the retrograde movement of said carriage, substantially as described.

56. In a printing-telegraph system, the combination of a battery, a main-line circuit, a type-wheel electro-magnet included therein, a unison electro-magnet in a branch of said circuit, means for transmitting short and long impulses of said line battery-circuit, a neutral escapement electro-magnet, means for diverting the current in said circuit and interrupting the impulses through the coils of said escapement electro-magnet during the prolongation of impulses in said line circuit and directing the circuits so that impulses of normal duration will energize the coils of said type-wheel electro-magnet, while prolonged impulses of twice the duration energize the unison electro-magnet, and means, substantially such as described, for re-enforcing the diverted current through said type-wheel electro-magnet, substantially as and for the purposes set forth.

57. In a printing-telegraph system, the combination, with a battery and a main-line circuit, of neutral escapement electro-magnets and unison electro-magnets of a transmitter and a receiver in separate line-circuits of the same batteries, the type-wheel electro-magnets, but not the unison electro-magnets, being responsive to short impulses to effect regular continuous rotation of the type-wheels, and the unison electro-magnets being responsive only to prolonged pulsations for releasing the unison-arm, said unison-arm, and means for transmitting short and long impulses of the line-battery, and means, substantially as described, for diverting the current in said line-circuit and interrupting the impulses through the coils of said neutral escapement electro-magnets during the prolongation of impulses in said line-circuit and directing the circuits so that impulses of normal duration will energize the coils of said type-wheel electro-magnets, while prolonged impulses of twice the duration energize the unison electro-magnets.

58. In a printing-telegraph system, the combination, with a battery and circuit, a ratchet electro-magnet included in said circuit, and its actuated devices, of a shaft, a ratchet-wheel mounted thereon and actuated by said electro-magnet, a printing-hammer operated by said ratchet-wheel, a paper-carriage and its actuating mechanism, substantially such as described, a type-wheel shaft, and one or more type-wheels mounted on and rotated by said shaft, all arranged substantially as described, whereby when the printing-hammer strikes a blow it instantly falls back clear of the paper.

59. In a printing-telegraph system, the combination, with a printing and ratchet electro-magnet in a local-battery circuit, devices actuated by said electro-magnet, and a printing-hammer operated thereby, of a paper-carriage and its operative mechanism, a type-wheel shaft, a star-wheel mounted thereon, an escapement electro-magnet in a main-line battery-circuit, wedge-pallets operated thereby, two type-wheels mounted on said shaft, and means, substantially such as described, for shifting said type-wheels, for the purposes set forth.

60. In a printing-telegraph system, the combination, with a battery, a main-line circuit, a sunflower, and circuit-keys, an insulated brush, a type-wheel shaft, and means for rotating and arresting said shaft, type-wheels mounted on a loose sleeve on said shaft, and circuit-directing devices and a star-wheel mounted on the same shaft, of ratchet and releasing electro-magnets in the same circuit and their actuated devices, a paper-carriage, and means, substantially such as described, for advancing and releasing said carriage, substantially as and for the purposes set forth.

61. In a printing-telegraph system, the combination of a main-line battery-circuit, a sunflower, and character-keys in the circuit of said battery, an insulated brush traversing the segments of said sunflower, a shaft, type-wheels mounted thereon, means for rotating and arresting said shaft, a circuit-director mounted on the same shaft, a printing-line battery-circuit, a ratchet, electro-magnet included therein, a printing-hammer, and a paper-carriage, and means, substantially as described, for operating the same, and feeding and releasing electro-magnets, with their devices actuated thereby, substantially as and for the purposes set forth.

62. In a printing-telegraph system, the combination, with a type-wheel-line battery-circuit, a sunflower, and circuit-keys included in said line-circuit, a brush traversing the segments of said sunflower, a type-wheel shaft, means for rotating said shaft, a circuit-director mounted on said shaft, and type-wheels rotated thereby, of a battery and a printing-circuit, a ratchet and printing electro-magnet included in said circuit, and a printing-hammer operated by a direct blow through the actuated devices of said electro-magnet, substantially as and for the purposes set forth.

63. In a printing-telegraph system, the combination, with a battery, a type-wheel-line circuit, keys with open and closed contact-springs in the circuit of said battery, a sunflower, substantially as described, with three successive segments connected to closed-circuit springs, and an insulated brush, of a neutral escapement electro-magnet and wedge-pallets operated thereby, a shaft and a star-wheel mounted thereon, a circuit director and corrector mounted on the same shaft, and a unison electro-magnet with its actuated devices, the said unison electro-magnet being included in a branch of said line-circuit, substantially as and for the purposes set forth.

64. In a printing-telegraph system, the combination of a line-battery, a circuit, keys with open and closed contact springs in the circuit of said battery, a sunflower device, substantially such as described, with three successive segments connected to closed-circuit springs, an insulated contact-brush, a neutral escapement electro-magnet, wedge-pallets actuated thereby, a type-wheel shaft, a star-wheel mounted thereon, a relay electro magnet included in said line-battery circuit, a circuit-corrector mounted on the same shaft, and a unison electro-magnet with its actuated devices, the said electro-magnet and the escapement electro-magnet being included in a branch of said line-circuit, substantially as and for the purposes set forth.

65. In a printing-telegraph system, the combination, with a battery and a main-line circuit, keys with open and closed contact-springs in the circuit of said battery, a sunflower, substantially as described, an insulated brush on a shaft, said brush connected with said main line and traversing said insulated contacts, causing a prolonged closed circuit in the line once in each revolution of the type-wheel, a neutral escapement electro-magnet in said circuit, its armature, lever, and pallets, a scape-wheel mounted on said shaft, and a relay electro-magnet for closing said circuit through a corrector, of a circuit-correcting device, a unison electro-magnet in a branch of the main-line circuit, and its actuated devices, substantially as and for the purposes set forth.

66. In a printing-telegraph system, the combination of a circuit-correcting device, a type-wheel shaft whereon said device is mounted, means for rotating said shaft, a line-battery circuit, a relay included in said circuit, connected therewith in such manner as to close said circuit through said correcting device, circuit-keys, and a sunflower device, arranged substantially as described, with three successive closed-circuit segments therein, and a unison electro-magnet in a branch of said line-circuit, and the devices actuated by said electro-magnet, substantially as and for the purposes set forth.

67. In a printing-telegraph system, the combination, with a main-line-battery circuit, keys with open and closed contact-springs in the circuit of said battery, a sunflower with three successive contacts connected to closed circuit-springs, and an insulated brush carried on a shaft connected with said main line and traversing said insulated contacts, causing a prolonged closed circuit in the line once in each revolution of the type-wheels of the instrument, of a neutral escapement electro-magnet in a branch of said circuit, its actuated devices, a unison electro-magnet, with its armature, lever, and stop, and a circuit-corrector, the said unison electro-magnet being included in a branch of said main-line circuit, substantially as and for the purposes set forth.

68. In a printing-telegraph system, the combination, with a circuit-directing device, a type-wheel shaft, and means for imparting rotary motion to said shaft, a main-line circuit, a local-battery circuit, transmitting-keys, and a circuit-interrupting device, of a printing and ratchet electro-magnet, its actuated devices, a paper-carriage carrying an angular shaft, and a shaft with feed-rollers thereon, a flanged pinion moving on said angular shaft and engaging in a spur-wheel between said feed-rollers, a rack, counter-rack, pawls, counter-pawls, and feeding and releasing electro-magnets in said local-battery circuit and their actuated mechanism, substantially as and for the purposes set forth.

69. In a printing-telegraph system, the combination, with a local-battery circuit and feeding and releasing electro-magnets included in said circuit, of a paper-carriage, arranged substantially as shown and described, a rack, pawl, and dog, a ratchet electro-magnet in said battery-circuit, devices actuated by said electro-magnet, a shaft, a ratchet-wheel mounted thereon, a printing-hammer operated by said ratchet-wheel, a type-wheel shaft, means, substantially such as described, for revolving and arresting said shaft, type-wheels mounted on and rotated with said shaft, and a circuit-director secured to the same shaft, substantially as shown and described, and for the purposes set forth.

70. In a printing-telegraph system, the combination, with a battery and a local circuit and feeding and releasing electro-magnets included therein, of a paper-carriage carrying an angular shaft and a secondary shaft with feed-rollers thereon, a flanged pinion moving on said angular shaft and engaging in a spur-wheel between said feed-rollers, and an automatic device, substantially such as described, operating to give a signal, thereby indicating to an operator when the paper-carriage has terminated its retrograde movement, substantially as and for the purposes set forth.

71. In a printing-telegraph system, the combination, with a battery and a main-line circuit, an escapement electro-magnet, wedge-pallets actuated thereby, and electrical devices for sending pulsations through said circuit, of a type-wheel shaft, a star-wheel mounted thereon, type-wheels suitably attached to said shaft, a main-line printing-circuit, electrical devices in said circuit, two independent electro-magnets in separate circuits through said electrical devices, a ratchet electro-magnet in said printing-circuit, a printing-hammer, and a paper-carriage, substantially as and for the purposes set forth.

72. In a printing-telegraph system, the combination of a type-wheel shaft and one or more type-wheels suitably mounted thereon, means for rotating the same, a circuit-director on said shaft, springs bearing on said director carrying insulations and contacts, a main-line printing-circuit, a feeding electro-magnet, devices actuated thereby, a printing-hammer, a paper-carriage, and a ratchet electro-magnet in said printing-circuit closed through said director, substantially as and for the purposes set forth.

73. In a printing-telegraph system, the combination, with a neutral escapement electro-magnet and wedge-pallets operated thereby, a battery, a main-line circuit, and an electrical device for sending pulsations through said circuit, of a type-wheel shaft, a star scape-wheel mounted thereon, double type-wheels secured to a sleeve loosely mounted on the same shaft, a local-battery circuit, two independent electro-magnets and their actuated devices for shifting said type-wheels, a printing electro-magnet in said local circuit, and a device attached to said type-wheel shaft for directing the circuits through said electro-magnets, substantially as and for the purposes set forth.

74. In a printing-telegraph system, the combination of a line-battery circuit, keys with open and closed contact-springs in the circuit of said battery, a sunflower with contacts electrically connected alternately in open and closed circuits with said contact-springs, a type-wheel shaft and means for rotating said shaft, a circuit-director, a paper-carriage carrying an angular shaft, a shaft with feed-rollers mounted thereon, a flanged pinion moving on said angular shaft and engaging in a spur-wheel on said shaft carrying feed-rollers, a rack, ratchet, and releasing electro-magnets and devices actuated thereby, said electro-magnet operating to release the paper-carriage at any point in its excursion, substantially as described.

75. In a printing-telegraph system, the combination, with a line battery and circuit, keys with open and closed contact-springs in the circuit of said battery, a sunflower with contacts electrically connected alternately in open and closed circuits with said contact-springs, a type-wheel shaft and means for rotating the same, two type-wheels secured to a loose sleeve thereon, two independent electro-magnets with their actuated devices, a circuit-closing device, a local-battery circuit, and ratchet and feeding electro-magnets with their actuated mechanism, said electro-magnets being in said local circuit, of a paper-carriage carrying a shaft with feed-rollers thereon, a ratchet-wheel between said feed-rollers, a ratchet-lever mounted thereon, its pawl and spring, and a feeding-rod secured to arms projecting from a rock-shaft pivoted on a fixed support and actuated by said feeding electro-magnet, substantially as and for the purposes set forth.

76. In a printing-telegraph system, the combination of a battery, a main-line circuit, character-keys, a sunflower in said circuit, a type-wheel shaft, a star-wheel mounted thereon, an escapement electro-magnet and wedge-pallets operated thereby for driving said star-wheel, two type-wheels mounted on said shaft, a local-battery circuit, a circuit-director mounted on the same shaft and circuit-springs bearing on said director for closing the circuit of said battery, two electro-magnets in separate circuits through said director, means, substantially such as described, for shifting said type-wheels, a ratchet electro-magnet with its actuated devices, a printing-hammer, a feeding electro-magnet included in said circuit, and a paper-carriage with its operative mechanism, substantially as described, and for the purposes set forth.

77. In a printing-telegraph system, the combination of a line-battery circuit, keys with open and closed contact-springs in the circuit of said battery, a sunflower with contacts electrically connected alternately in open and closed circuits with said contact-springs, a type-wheel shaft, a star-wheel mounted thereon, an escapement electro-magnet and wedge-pallets operated thereby, an electrical device on said type-wheel shaft and contact-springs bearing on said device for closing the circuits of said battery, a paper-carriage, a local battery and circuit, a ratchet electro-magnet with its actuated mechanism, a feeding electro-magnet included in said local circuit, and its actuated devices, substantially as and for the purposes set forth.

78. In a printing-telegraph system, the combination of a line-battery circuit, keys with open and closed contact-springs in the circuit of said battery, a sunflower with contacts electrically connected alternately in open and closed circuits with said contact-springs, a type-wheel shaft, a star-wheel mounted thereon, wedge-pallets and an escapement electro-magnet for actuating said pallets and thereby driving said star-wheel, type-wheels rotated by said shaft, a local-battery circuit, a circuit-director attached to said type-wheel shaft, contact-springs bearing on said director carrying insulations and contacts for closing the circuit of said battery, two independent electro-magnets in separate circuits through said director, said electro-magnets with their actuated devices operating to shift said type-wheels, a ratchet electro-magnet with its actuated devices and a printing-hammer actuated thereby, and the ratchet electro-magnet energized by impulses in the circuit of said local battery, substantially as and for the purposes set forth.

79. In a printing-telegraph system, the combination, with a battery and a main-line circuit, keys with contact-springs in the circuit of said battery, a sunflower with contacts electrically connected alternately with said contact-springs, and a brush traversing said contacts, of a shaft, a star-wheel mounted thereon and means for rotating the same, two type-wheels secured to a sleeve mounted on said shaft, a local battery and circuit, a circuit-director on said shaft, contact-springs bearing on said director having insulations and contacts to close the circuit of said battery, two electro-magnets in separate circuits connected with two of the contacts of said director, said electro-magnets with their hinged lever, armature, shaft, lever-arms, and devices operating to shift said type-wheels, a ratchet, electro-magnet with its armature, lever, retracting-spring, ratchets, and a printing-hammer, said electro-magnets energized by impulses in the circuit of said local battery, substantially as and for the purposes set forth.

80. In a printing-telegraph system, the combination, with a main-line circuit and battery, keys with contact-springs in the circuit of said battery, a sunflower with contacts electrically connected alternately with said contact-springs, and brushes traversing said contacts, of a type-wheel shaft, a star-wheel on said shaft, two type-wheels secured to a sleeve mounted thereon, a local battery and circuit, an electrical device on said shaft, circuit-springs bearing on said device, having insulations and contacts operating automatically to close the circuit of said battery, two independent electro-magnets in separate circuits connected with two of the contacts of said electrical device, said electro-magnets provided with an armature, hinged lever, and mechanism, as described, operating to shift said type-wheels, substantially as and for the purposes set forth.

81. In a printing-telegraph system, the combination, with a battery and a type-wheel-line circuit, keys with open and closed contact-springs in the circuit of said battery, and a sunflower with contacts electrically connected alternately in open and closed circuits with said contact-springs, of a type-wheel shaft, a scape-wheel mounted on said shaft, an electro-magnet, its armature, lever, retracting-spring, pallets for actuating said scape-wheel, two type-wheels secured to a loose sleeve on said shaft, a local battery and circuit, a circuit-director secured to said shaft, springs bearing on said director carrying insulations and contacts for closing the circuits of said battery, and two electro-magnets in separate circuits through said director, substantially as and for the purposes set forth.

82. In a printing-telegraph system, the combination, with a battery and circuit, keys with open and closed contact-springs in the circuit of said battery, a sunflower with contacts electrically connected alternately in open and closed circuits with said contact-springs, a type-wheel shaft, a star-wheel, pallets, and electro-magnetic devices for actuating said shaft, of type-wheels secured to a sleeve on said shaft, a local battery and circuit, a circuit-director secured to said shaft, springs bearing on said director carrying insulations and contacts for closing the circuit of said battery, and two independent electro-magnets in separate circuits through said director, said electro-magnets with their hinged lever, armature, shaft, lever-arms, and devices operating to shift said type-wheels, substantially as and for the purposes set forth.

83. In a printing-telegraph system, the combination of a battery and a type-wheel-line circuit, of a neutral escapement electro-magnet in said circuit, electrical devices for closing the circuit through the coils of said neutral escapement electro-magnet, its armature-lever and wedge-pallets, a type-wheel shaft, a star-wheel mounted thereon, a circuit-correcting device, a unison-arm thereon, and a unison electro-magnet with its actuated means, said unison electro-magnet included in parallel circuit with the neutral electro-magnet through said corrector once in each revolution thereof and responding to pulsations of twice the duration of those employed to actuate the neutral escapement electro-magnet, substantially as and for the purposes set forth.

84. In a printing-telegraph system, the combination, with type-wheel and printing-line circuits and batteries, transmitting-keys, and a double sunflower device, of a neutral escapement electro-magnet included in the type-wheel-line circuit, its armature, lever, retracting-spring, and pallets, a type-wheel shaft, a scape-wheel, type-wheels rotated therewith, a circuit director and corrector, a unison-arm mounted on the same shaft, and a unison electro-magnet with its actuated devices, said unison electro-magnet being included in parallel circuit with the neutral escapement electro-magnet through said corrector once in each revolution thereof and responding to pulsations of twice the duration of those employed to actuate the said neutral escapement electro-magnet, substantially as and for the purposes set forth.

85. In a printing-telegraph system, the combination, with type-wheel and printing-line circuits and batteries, transmitting-keys and a double sunflower device, one series of segmental contacts electrically connected alternately in open and closed circuits with said type-wheel-line circuit, while the other series is connected to open circuit springs and contacts in the printing-circuit, and brushes sweeping over said contacts, of a type-wheel shaft, a star-wheel mounted on said shaft, a neutral escapement electro-magnet, its armature, lever, retracting-spring, and pallets, circuit directing and correcting devices mounted on the same shaft, a unison-arm thereon, and a unison electro-magnet with its actuated devices, said unison electro-magnet included in parallel circuit with said neutral escapement electro-magnet through said corrector once in each revolution thereof and responding to pulsations of twice the duration of those employed to actuate said neutral electro-magnet, substantially as and for the purposes set forth.

86. In a printing-telegraph system, the combination, with type-wheel and printing-line circuits and batteries, transmitting-keys and a double sunflower device, one series of segmental contacts thereof electrically connected alternately in open and closed circuits with said type-wheel-line circuit, while the other series is connected to open-circuit springs and contacts in the printing-line circuit, brushes sweeping over the contacts of said sunflower device, a type-wheel shaft, a scape-wheel thereon, two type-wheels mounted on a sleeve on said shaft, a neutral electro-magnet with its armature, lever, spring, and pallets, a circuit director and corrector mounted on the same shaft with the unison-arm, contact-springs bearing on said director and corrector provided with insulations and contacts for closing the circuits, a unison electro-magnet with its armature, lever, and spring, said unison electro-magnet being in parallel circuit with said neutral electro-magnet through said corrector once in each revolution thereof, two independent electro-magnets in separate circuits connected with two of the contacts of said director, their armature, hinged lever, and the devices operated by said electro-magnets for shifting the type-wheels, a printing-hammer, and a ratchet electro-magnet in said printing-circuit and its actuated mechanism, substantially as and for the purposes set forth.

87. In a printing-telegraph system, the combination, with type-wheel and printing-line circuits and batteries, character-keys, a double sunflower device, substantially such as described, brushes sweeping over the contacts of said sunflower device, a type-wheel shaft, a star scape-wheel and two type-wheels mounted on said shaft, an escapement electro-magnet with its armature, lever, spring, and pallets, a circuit director and corrector on said shaft, contact-springs bearing on said director and corrector, having insulations and contacts for closing the circuit of said batteries, a unison-arm on the same shaft, a unison electro-magnet with its armature, lever, and retracting-spring, said electro-magnet being in parallel circuit with said escapement electro-magnet through said corrector once in each revolution thereof and responding to pulsations of twice the duration of those employed to actuate said escapement electro-magnet, a printing-hammer, a paper-carriage, and means, substantially as described, for advancing and releasing the same, as and for the purposes set forth.

88. In a printing-telegraph system, the combination of type-wheel and printing-line circuits and batteries, transmitting-keys, a double sunflower device, substantially as described, brushes sweeping over the contacts of said device, a type-wheel shaft, a star-wheel and two type-wheels mounted thereon, an escapement electro-magnet with its actuated devices, a circuit director and corrector on said shaft, springs bearing on said devices provided with insulations and contacts for closing the circuit of said batteries, a unison-arm on said type-wheel shaft, a unison electro-magnet with its armature, lever, and retracting-spring, said electro-magnet being in parallel circuit with said escapement electro-magnet through said corrector once in each revolution thereof and responding to pulsations of twice the duration of those employed to actuate said escapement electro-magnet, a printing-hammer, ratchet electro-magnet in the printing-circuit, its armature, lever, retracting-spring, devices actuated by said electro-magnet for operating said printing-hammer, feeding and releasing electro-magnets in the circuit of said printing-battery, and a transversely-traveling paper-carriage, substantially as and for the purposes set forth.

89. In a printing-telegraph system, the combination of type-wheel and printing batteries and circuits, transmitting-keys with their springs and contacts in the circuits of said batteries, a double sunflower, one series of segmental contacts thereof electrically connected alternately in open and closed circuits with said type-wheel line and the other series of said segmental contacts connected to open-circuit springs and contacts in the printing-circuit, brushes sweeping over said segmental contacts, a type-wheel shaft, means for rotating the same, two type-wheels secured to a sleeve mounted on said shaft, a circuit-director on the same shaft, springs bearing on said director provided with insulations and contacts for closing the circuits of said battery, and two electro-magnets in separate circuits connected with two of the contacts of said director, their armature, hinged lever, and devices actuated thereby for shifting said type-wheels, substantially as and for the purposes set forth.

90. In a printing-telegraph system, the combination of type-wheel and printing-line circuits and batteries, transmitting-keys with their springs and contacts in the circuits of said batteries, a double sunflower, one series of segmental contacts thereof electrically connected alternately in open and closed circuits with said type-wheel-line circuit, while the other series of segmental contacts is connected to open-circuit springs and contacts in the printing-line circuit, brushes sweeping over said contacts, a type-wheel shaft, means for rotating the same, two type-wheels secured to a sleeve mounted on said shaft, a circuit-director on the same shaft, springs bearing on said director having insulations and contacts for closing the circuits of said printing-battery, two electro-magnets in separate circuits connected with two of the disks of said director, their armature, lever, spring, and devices actuated by said electro-magnets for shifting said type-wheels, a ratchet electro-magnet in the circuit of said printing-battery, its armature, lever, spring, and mechanism actuated by said electro-magnet, and a printing-hammer actuated thereby, substantially as and for the purposes set forth.

91. In a printing-telegraph system, the combination of main-line type-wheel and printing circuits and batteries, transmitting-keys with their springs and contacts in the circuits of said batteries, a double sunflower with segmental contacts, one series being electrically connected alternately in open and closed circuits with said type-wheel line, while the other series of said segmental contacts is connected to open-circuit springs and contacts in the printing-circuit, brushes traversing over said contacts, a type-wheel shaft, and means, substantially as described, for revolving the same, two type-wheels suitably mounted on said shaft, a circuit-director on the same shaft, springs bearing on said director provided with insulations and contacts for closing the circuits of said printing-battery, and two electro-magnets in separate circuits connected with two of the disks of said director, their armature, hinged lever, and mechanism actuated by said electro-magnets for shifting said type-wheels, of a ratchet electro-magnet in the said printing-battery circuit, its actuated devices, a printing-hammer, a paper-carriage, and feeding and releasing electro-magnets with their actuated devices, substantially as and for the purposes set forth.

92. In a printing-telegraph system, the combination of type-wheel and printing-line circuits and batteries, character-keys, with their springs and contacts in the circuits of said batteries, a double sunflower device with contacts, one series of which is connected with the type-wheel-line circuit and the other series with the printing-line circuit, brushes traversing said sunflower-contacts, a type-wheel shaft, type-wheels mounted on said shaft, a circuit-director on the same shaft, springs bearing on said director, having insulations and contacts for closing the circuits of said printing-battery, a printing and ratchet electro-magnet in the circuit of said battery, its actuated devices, a printing-hammer, a releasing electro-magnet in parallel circuit with said printing and ratchet electro-magnet, its actuated mechanism, a transversely-traveling paper-carriage, and an automatic signaling device to indicate when said carriage has completed its retrograde movement, substantially as described.

93. In a printing-telegraph system, the combination, with a battery, a main-line circuit for setting the type-wheels, transmitting-keys, their contacts, and sunflower devices for connecting the battery with said line and the segments of said device, of a neutral escapement electro-magnet responding to alternate makes and breaks of circuit and included in said type-wheel line, its armature, lever, spring, and wedge-pallets, said electro-magnet actuating said wedge-pallets driving a star-wheel mounted on a shaft rotated in response to pulsations automatically produced by a brush on the said shaft, said brush contacting with open and closed circuit segments of said sunflower, and by which said shaft is arrested when the alternate succession of impulses is interrupted by the depression of a key, a circuit-corrector on the said shaft, and a unison electro-magnet included in parallel circuit with the neutral escapement electro-magnet through said corrector once in each revolution thereof and responding to pulsations of twice the duration of those employed to actuate said neutral escapement electro-magnet, substantially as set forth.

94. In a printing-telegraph system, the combination, with a battery, a main-line circuit for setting the type-wheels, transmitting-keys, their contacts, and a sunflower device, and means, substantially as described, for connecting said battery with said line and segments of the sunflower device, of a neutral escapement electro-magnet responding to alternate makes and breaks of circuit and included in said type-wheel line, its armature, lever, retracting-spring, and wedge-pallets, said electro-magnet actuating said wedge-pallets driving a star-wheel mounted on a shaft rotated in response to pulsations automatically produced by a traversing brush mounted on the same shaft, said brush contacting with open and closed circuit segments of said sunflower device, by which said shaft is arrested when the alternate succession of impulses is interrupted by the depression of a key, a circuit-correcting device and a unison-arm on the same shaft, and a unison electro-magnet included in parallel circuit with said neutral escapement electro-magnet through said corrector once in each revolution thereof and responding to pulsations of twice the duration of those employed to actuate said neutral escapement electro-magnet, substantially as and for the purposes set forth.

95. In a printing-telegraph system, the combination, with a battery, a main type-wheel-line circuit, transmitting-keys, their contacts and springs, and a sunflower device, of a neutral escapement electro-magnet responding to alternate makes and breaks of circuit and included in said type-wheel line, its armature, lever, retracting-spring, and wedge-pallets, said electro-magnet operating said wedge-pallets, which drive a star-wheel mounted on a type-wheel shaft and rotated in response to pulsations automatically produced by a traversing brush mounted on the same shaft, said brush contacting with open and closed segments of said sunflower device, by which said shaft is arrested when the alternate succession of impulses is interrupted by the depression of a key, and type-wheels suitably mounted on the same shaft, of a circuit-correcting device and a unison-arm mounted on the said shaft, a unison electro-magnet with its armature, lever, and retracting-spring, said electro-magnet being included in parallel circuit with said neutral escapement electro-magnet through said corrector once in each revolution thereof and responding to pulsations of twice the duration of those employed to actuate said neutral electro-magnet, a printing-hammer, a ratchet electro-magnet in a printing-battery circuit, and its actuated devices, whereby said hammer is operated by a direct blow and then falls back clear of the type-wheels, substantially as set forth.

96. In a printing-telegraph system, the combination, with a double sunflower device, of main lines and batteries for controlling, respectively, the type-wheels and the printing mechanism, transmitting-keys, their contact-springs, electrical devices for connecting said batteries with said lines and sunflower-segments, a neutral escapement electro-magnet included in one of said lines and responding to alternate makes and breaks of circuit, said electro-magnet actuating wedge-pallets for driving a star-wheel mounted on the type-wheel shaft, a revolving brush contacting with alternate open and closed circuit segments of one of said sunflowers connected with the type-wheel line, and by which said type-wheel shaft is arrested when the alternate succession of impulses is interrupted by the depression of a key, which at the same time actuates said electrical devices connecting the line controlling the printing mechanism with a segment of the sunflower in the printing-line, whereby when the type-wheel shaft is arrested another brush thereon contacts with said segment and an impulse is sent over said line, a correcting device, and a unison-arm mounted on the said type-wheel shaft, and a unison electro-magnet included in parallel circuit with said neutral escapement electro-magnet through said corrector once in each revolution thereof and responding to pulsations of twice the duration of those employed to actuate said neutral electro-magnet, substantially as and for the purposes set forth.

97. In a printing-telegraph system, the combination, with a double sunflower device, of main lines and batteries for controlling, respectively, the type-wheels and printing mechanism, character-keys, their contact-springs, electrical devices for connecting said batteries with said lines and sunflower-segments, a neutral escapement electro-magnet included in one of said lines and responding to alternate makes and breaks of circuit, said electro-magnet actuating wedge-pallets for driving a star-wheel mounted on said type-wheel shaft, a revolving brush contacting with alternately open and closed circuit segments of one of said sunflowers connected with said line, and by which said type-wheel shaft is arrested when the alternate succession of impulses is interrupted by the depression of a key, which at the same time actuates said electrical devices connecting the line controlling the printing mechanism with a segment of said sunflower in the printing-line, whereby when the type-wheel shaft is arrested another brush thereon contacts with said segment and an impulse is sent over said line, a circuit-corrector and a unison-arm mounted on said shaft, a unison electro-magnet included in parallel circuit with said escapement electro-magnet through said corrector once in each revolution thereof and responding to pulsations of twice the duration of those employed to actuate said neutral electro-magnet, and a relay in said type-wheel line for closing the circuit of said line in parallel circuit through said escapement and unison electro-magnets, substantially as and for the purposes set forth.

98. In a printing-telegraph system, the combination, with a battery and main type-wheel-line circuit, of transmitting-keys with their contact-springs, a sunflower device having segmental contacts included in the circuit of said battery, a neutral escapement electro-magnet included in said type-wheel circuit and responding to alternate makes and breaks of circuit therein, its armature, lever, retracting-spring, wedge-pallets carried by said lever, a type-wheel shaft, and a star scape-wheel mounted thereon, said star scape-wheel being driven and arrested by said wedge-pallets actuated by pulsations through said electro-magnet, substantially as and for the purposes set forth.

99. In a printing-telegraph system, the combination of type-wheel and printing-line circuits and batteries, a double sunflower device in an automatically-operating instrument, one series of segments in said sunflower device connected directly with the type-wheel-line circuit, transmitting-keys with their contact-springs, and traversing brushes mounted on a shaft, said keys and brushes operating to alternately make and break the circuit through said type-wheel line to arrest a type-wheel at a character and at the same time close said printing-line through the other segments of said sunflower device, substantially as and for the purposes set forth.

100. In a printing-telegraph system, the combination, with a battery and main-line circuit, of a central-station pulsator, a battery and printing-line circuit and a detent electro-magnet included in said circuit, terminal-station instruments organized as transmitters and receivers, and escapement electro-magnets therein, the transmitter operating to cause said central-station pulsator to be arrested, while at the same time said pulsator is operating said escapement electro-magnets of two connected instruments through said type-wheel line, substantially as and for the purposes described.

101. In a printing-telegraph system, the combination of a paper-feeding device consisting of a feeding-roller mounted on a shaft pivoted to the paper-carriage, a ratchet-wheel secured centrally to said shaft, a ratchet-lever carrying a pawl, said lever turning loosely on said shaft, and a vibrating feeding-rod held in supports and actuated by an electro-magnet, said ratchet-lever traveling in said feeding-rod and operating to feed the paper between lines at any point in the excursion of said carriage, substantially as set forth.

102. In a printing-telegraph, the combination of the face-plate $a^{12}$, the fixed guards $d^{27}$ and $d^{28}$, the shaft D, and the shifting type-wheels D' D², so arranged relatively to each other that one type-wheel is shielded by said guard $d^{28}$ while the other wheel is in position to give its impression, substantially as described.

103. In a printing-telegraph, the combination of the ink-roller, the disks of felt $d^{32}$, compressed between removable heads $d^{33}$, and a spindle, $d^{34}$, pivoted in the side frames, $d^{13}$ $d^{14}$, substantially as described.

104. In a printing-telegraph, the combination, in a paper-feeding device, of a source of electricity and circuit, an electro-magnet in said circuit, a transversely-traveling paper-carriage carrying feed-rollers on a shaft pivoted to said carriage, a ratchet-wheel secured centrally on said shaft, and a lever with its pawl turning loosely on said shaft, a rock-arm pivoted to a fixed support carrying rigid arms, and a feeding-rod on which said ratchet-lever freely slides, an armature for the said electro-magnet with its lever, secured to said rock-shaft, and a retracting-spring operating, when said electro-magnet is energized, to feed the paper to space between two lines at any point in the excursion of said carriage.

105. In a printing-telegraph, the combination of the side bars, J J', shaft $j^6$, feed-rollers in two sections, $j^3$, roller $j^{10}$, ratchet-wheel $n^8$, ratchet-lever $n^{17}$, with an elongated aperture, $n^{18}$, pawl $n^6$, spring $n^7$, feeding-rod $n^{16}$, rigid arms $n^{15}$, rock-shaft $n^3$, armature-lever $n^2$, armature $n'$, retracting-spring $n^{10}$, electro-magnet N, and fixed support $A^3$, all arranged substantially as and for the purposes set forth.

106. In a printing-telegraph, the combination, in a paper-carriage, of the side bars, J J', bar $J^2$, brackets $j^{28}$, channel-bar $J^{13}$, friction-rollers $j^{26}$, and pivotal support $j^{29}$, all arranged substantially as and for the purposes set forth.

107. In a printing-telegraph, the combination of a printing-hammer, $h^{22}$, an elastic arm, $h^{21}$, a bell-crank, $h^{18}$, ratchet-wheels $h^{15}$ $h^{16}$, hook-pawl $h^{14}$, pivoted to a ratchet-lever, $h'$, armature $h$, and a ratchet electro-magnet, H, in the circuit of a source of electricity, whereby when said electro-magnet is energized the printing-hammer is caused to strike a blow and fall back clear of the paper, substantially as described.

108. In a printing-telegraph, the combination of a paper-carriage and a rack attached thereto, a printing and ratchet electro-magnet, its armature, lever, pawls, and retracting-spring, a dog pivoted to a fixed support, a releasing electro-magnet, its armature, lever, pins, and retracting-spring, a shaft, and means for operating said shaft, a director on the same shaft, a source of electrical energy, and a circuit, said electro-magnets energized in parallel circuits closed through said director, substantially as and for the purposes set forth.

109. In a printing-telegraph, the combination of a type-wheel battery and circuit, a sunflower and character-keys included in said circuit and operating to rotate and arrest a shaft by means of pallets driving a star-wheel mounted on said shaft, type-wheels and a circuit-director mounted on the same shaft, a local battery and circuit, said director being included in said circuit, and a printing electro-magnet with its actuated devices, said electro-magnet being energized by pulsations in said circuit, substantially as and for the purposes set forth.

110. In a printing-telegraph, the combination of a type-wheel-line battery and circuit and a printing-line battery and circuit, electrical devices for controlling a neutral electro-magnet in said type-wheel line, a shaft carrying a circuit-directing device, type-wheels and a star-wheel driven and arrested by said electro-magnet, and a printing electro-magnet energized by said printing-line circuit through said directing device, substantially as and for the purposes set forth.

111. In a printing-telegraph, the combination of a type-wheel-line battery and circuit, electrical devices for controlling a neutral electro-magnet in said circuit, a shaft carrying a circuit-directing device, type-wheels and a star-wheel driven and arrested by said electro-magnet, a paper-carriage carrying feed-rollers, a local battery and circuit, and an electro-magnet and its actuated devices for operating said feed-rollers, said electro-magnet being energized by said local-battery circuit through said director, substantially as and for the purposes set forth.

112. In a printing-telegraph, the combination, with a paper-carriage and a rack attached thereto, of a ratchet electro-magnet, its armature, lever, pawl, and retracting-spring, a dog on a fixed support, a shaft and means for operating the said shaft, a circuit-director on the same shaft, a source of electrical energy, and a circuit, said electro-magnet being energized by said circuit closed through said circuit-director, substantially as and for the purposes set forth.

113. In a printing-telegraph, the combination, with a paper-carriage, a rack and a counter-rack attached thereto, of a ratchet electro-magnet, its armature, lever, pawl, and retracting-spring, a counter-pawl pivoted to a fixed support and linked to said lever, a dog on a fixed support, a shaft and means for operating said shaft, a circuit-director, a source of electrical energy, and a circuit, said electro-magnet being energized by said circuit closed through said director, substantially as and for the purposes set forth.

114. In a printing-telegraph, the combination, with a type-wheel shaft, type-wheels and a circuit-director on said shaft, and means for controlling said shaft, of a source of electricity and its circuit, an electro-magnet included in said circuit, its actuated devices, and a printing-hammer and its actuating devices, whereby when said electro-magnet is energized by an impulse in said circuit through said circuit-director said printing-hammer is caused to strike a blow and fall back, substantially as described.

In witness whereof I have hereunto set my hand in the presence of two subscribing witnesses.

JACOB H. LINVILLE.

Witnesses:
  THOMAS M. SMITH,
  HERMANN BORMANN.